United States Patent
McHugh et al.

(10) Patent No.: US 9,840,885 B2
(45) Date of Patent: *Dec. 12, 2017

(54) SUB-SEA CHEMICAL INJECTION METERING VALVE

(71) Applicant: Cameron International Corporation, Houston, TX (US)

(72) Inventors: Edmund Peter McHugh, Longford (IE); James Eden White, Meath (IE); Donald R. Augenstein, Pittsburgh, PA (US); Matthew Mihalcin, Pittsburgh, PA (US)

(73) Assignee: Cameron International Corporation, Houston, TX (US)

( * ) Notice: Subject to any disclaimer, the term of this patent is extended or adjusted under 35 U.S.C. 154(b) by 264 days.

This patent is subject to a terminal disclaimer.

(21) Appl. No.: 14/726,523

(22) Filed: May 30, 2015

(65) Prior Publication Data

US 2015/0260003 A1 Sep. 17, 2015

Related U.S. Application Data

(63) Continuation of application No. 14/288,377, filed on May 27, 2014, now Pat. No. 9,062,527, which is a
(Continued)

(51) Int. Cl.
*E21B 33/076* (2006.01)
*E21B 34/04* (2006.01)
(Continued)

(52) U.S. Cl.
CPC ............ *E21B 33/076* (2013.01); *C02F 1/008* (2013.01); *E21B 34/04* (2013.01); *E21B 37/06* (2013.01);
(Continued)

(58) Field of Classification Search
CPC ........ E21B 33/076; E21B 34/04; E21B 37/06; E21B 41/02; G01F 15/005; G01F 15/06; C02F 1/008
See application file for complete search history.

(56) References Cited

U.S. PATENT DOCUMENTS

| | | |
|---|---|---|
| 4,003,252 A | 1/1977 | Dewath |
| 4,173,889 A | 11/1979 | Forster et al. |

(Continued)

FOREIGN PATENT DOCUMENTS

| | | | |
|---|---|---|---|
| EP | 0952430 A1 | 10/1991 | |
| FR | 2911680 A1 | 7/2008 | |

(Continued)

OTHER PUBLICATIONS

EP Communication Pursuant to Article 94(3) EPC; Application No. EP 12006405.0; Dated Apr. 11, 2014; 4 pages.
(Continued)

*Primary Examiner* — Daniel P Stephenson
(74) *Attorney, Agent, or Firm* — Fletcher Yoder, P.C.

(57) ABSTRACT

An apparatus that includes a chemical injection management system. The chemical injection management system may include an interface configured to couple the chemical injection management system to a mineral extraction system. In addition, the chemical injection management system may include an ultrasonic flow meter.

25 Claims, 19 Drawing Sheets

Related U.S. Application Data continuation of application No. 13/063,924, filed as application No. PCT/US2009/061732 on Oct. 22, 2009, now Pat. No. 8,763,693.

(60) Provisional application No. 61/120,227, filed on Dec. 5, 2008.

(51) Int. Cl.
| | | |
|---|---|---|
| *E21B 37/06* | (2006.01) | |
| *E21B 41/02* | (2006.01) | |
| *G01F 15/00* | (2006.01) | |
| *G01F 15/06* | (2006.01) | |
| *C02F 1/00* | (2006.01) | |

(52) U.S. Cl.
CPC ............ *E21B 41/02* (2013.01); *G01F 15/005* (2013.01); *G01F 15/06* (2013.01)

(56) References Cited

U.S. PATENT DOCUMENTS

| | | | |
|---|---|---|---|
| 4,195,517 A | 4/1980 | Kalinoski et al. | |
| 4,315,523 A | 2/1982 | Mahawili et al. | |
| 4,391,150 A | 7/1983 | Rey | |
| 4,856,321 A * | 8/1989 | Smalling | G01F 1/662 73/40.5 A |
| 4,864,869 A * | 9/1989 | Glasheen | G01F 1/115 324/174 |
| 5,194,012 A | 3/1993 | Cairns | |
| 5,369,998 A * | 12/1994 | Sowerby | G01F 1/66 73/861.04 |
| 5,463,905 A * | 11/1995 | Baird | G01F 1/663 73/861.23 |
| 5,477,101 A | 12/1995 | Ounadjela | |
| 5,558,532 A | 9/1996 | Hopper | |
| 5,794,701 A | 8/1998 | Cunningham et al. | |
| 5,841,734 A | 11/1998 | Ritter et al. | |
| 6,354,146 B1 | 3/2002 | Birchak et al. | |
| 6,418,792 B1 | 7/2002 | Spychalski | |
| 6,429,926 B1 | 8/2002 | Williamson et al. | |
| 6,481,504 B1 | 11/2002 | Gatherar | |
| 6,626,049 B1 * | 9/2003 | Ao | G01F 1/662 73/861.29 |
| 6,644,119 B1 | 11/2003 | Sinha | |
| 6,823,941 B2 | 11/2004 | Donald | |
| 6,851,444 B1 | 2/2005 | Kohl et al. | |
| 7,234,524 B2 | 6/2007 | Shaw et al. | |
| 7,243,729 B2 | 7/2007 | Tyrrell et al. | |
| 7,380,835 B2 | 6/2008 | McCoy et al. | |
| 7,389,786 B2 | 6/2008 | Zeck | |
| 7,389,787 B2 | 6/2008 | Means et al. | |
| 7,500,402 B2 * | 3/2009 | Pors | A61B 8/4209 73/861.28 |
| 8,066,076 B2 | 11/2011 | Donald et al. | |
| 8,327,875 B2 | 12/2012 | Grace et al. | |
| 8,522,623 B2 | 9/2013 | Quin et al. | |
| 8,522,624 B2 | 9/2013 | Quin et al. | |
| 8,763,693 B2 * | 7/2014 | McHugh | E21B 33/076 166/250.01 |
| 9,062,527 B2 * | 6/2015 | McHugh | E21B 33/076 |
| 9,448,092 B1 * | 9/2016 | Hawwa | G01F 1/663 |
| 2002/0011336 A1 | 1/2002 | Baskett et al. | |
| 2002/0089659 A1 | 7/2002 | Williamson et al. | |
| 2004/0226360 A1 | 11/2004 | Lotters | |
| 2005/0210999 A1 | 9/2005 | Sylvia et al. | |
| 2008/0148841 A1 | 6/2008 | Sakai | |
| 2008/0163692 A1 | 7/2008 | Huang et al. | |
| 2008/0217022 A1 | 9/2008 | Deans | |
| 2008/0257032 A1 | 10/2008 | Zollo et al. | |
| 2009/0025936 A1 | 1/2009 | Donald et al. | |
| 2010/0126600 A1 | 5/2010 | Watson | |
| 2012/0312522 A1 | 12/2012 | Quin et al. | |
| 2014/0260668 A1 * | 9/2014 | Liu | G01F 1/66 73/861.28 |
| 2015/0260003 A1 * | 9/2015 | McHugh | E21B 33/076 166/90.1 |
| 2016/0161310 A1 * | 6/2016 | Leaders | G01F 1/663 702/48 |

FOREIGN PATENT DOCUMENTS

| | | |
|---|---|---|
| GB | 2163557 A1 | 2/1986 |
| WO | WO0019242 | 4/2000 |
| WO | WO0020829 | 4/2000 |
| WO | 2008/042972 A1 | 4/2008 |
| WO | WO2008095113 A2 | 8/2008 |
| WO | WO2010065210 A1 | 6/2010 |

OTHER PUBLICATIONS

Chinese Office Action and English Translation; Application No. CN 200980147501.X; Dated Jun. 24, 2014; 13 pages.

Singapore Examination Report Application No. SG 201102680-4; Dated Mar. 5, 2012; 6 pages.

PCT International Search Report and Written Opinion; Application No. PCT/US2009/061732; Dated Mar. 17, 2010; 13 pages.

* cited by examiner

SUB-SEA CHEMICAL INJECTION METERING VALVE

CROSS REFERENCE TO RELATED APPLICATIONS

This application claims priority to and benefit of U.S. Non-Provisional patent application Ser. No. 14/288,377, entitled "Sub-Sea Chemical Injection Metering Valve," filed May 27, 2014, which is herein incorporated by reference in its entirety, which claims priority to and benefit of U.S. Non-Provisional patent application Ser. No. 13/063,924, entitled "Sub-Sea Chemical Injection Metering Valve," filed Mar. 14, 2011, which is herein incorporated by reference in its entirety, which claims priority to and benefit of PCT Patent Application No. PCT/US2009/061732, entitled "Sub-Sea Chemical Injection Metering Valve," filed Oct. 22, 2009, which is herein incorporated by reference in its entirety, and which claims priority to and benefit of U.S. Provisional Patent Application No. 61/120,227, entitled "Sub-Sea Chemical Injection Metering Valve", filed on Dec. 5, 2008, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Wells are often used to access resources below the surface of the earth. For instance, oil, natural gas, and water are often extracted via a well. Some wells are used to inject materials below the surface of the earth, e.g., to sequester carbon dioxide, to store natural gas for later use, or to inject steam or other substances near an oil well to enhance recovery. Due to the value of these subsurface resources, wells are often drilled at great expense, and great care is typically taken to extend their useful life.

Chemical injection management systems are often used to maintain a well and/or enhance throughput of a well. For example, chemical injection management systems are used to inject corrosion-inhibiting materials, foam-inhibiting materials, wax-inhibiting materials, and/or antifreeze to extend the life of a well or increase the rate at which resources are extracted from a well. Typically, these materials are injected into the well in a controlled manner over a period of time by the chemical injection management system.

The life of a chemical injection management system may be limited by its mechanical components, such as gearboxes, motors, and valves that can wear out. Further, sensors and actuators used to control flow rate can drift over time, and, as a result, the accuracy of the chemical injection management system can decline. These problems may be particularly acute in sub-sea applications, where the chemical injection management system may be difficult and/or expensive to access. Replacing a worn out or inaccurate chemical injection management system can significantly add to the cost of operating a well, for instance.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

Figure 1:
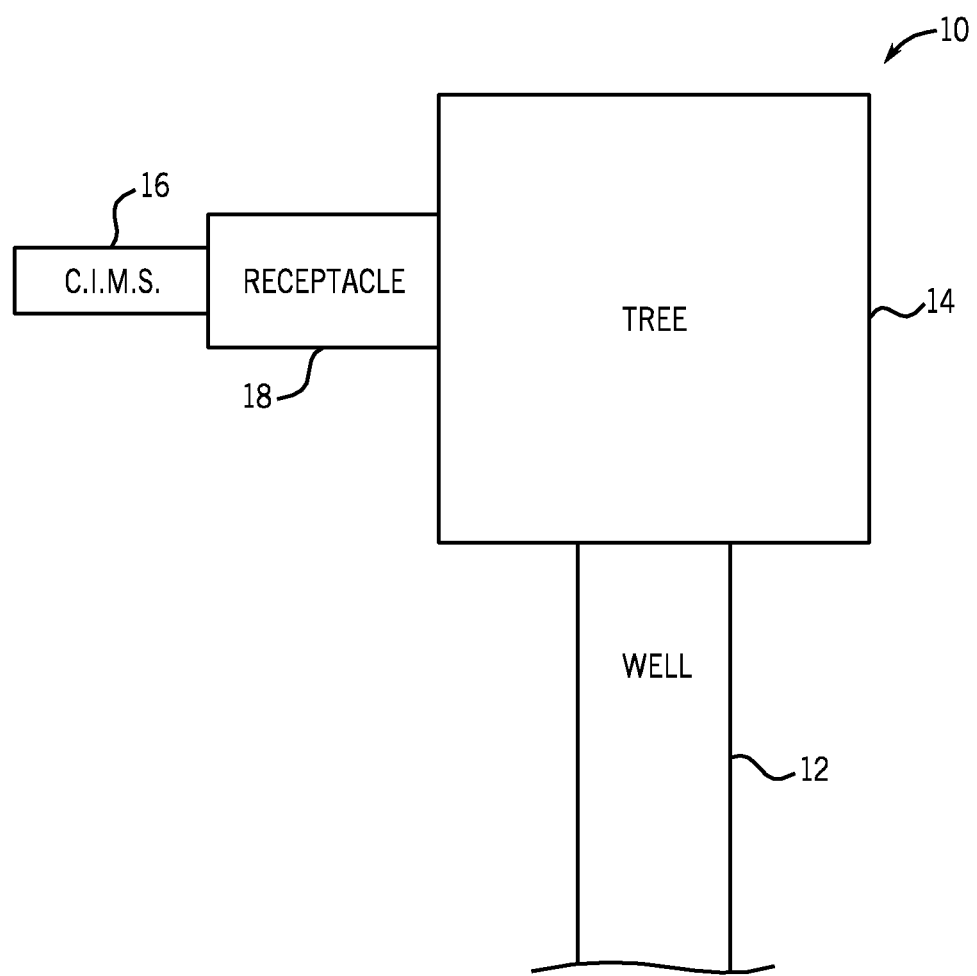
FIG. 1 is a perspective view of an exemplary resource extraction system in accordance with an embodiment of the present technique.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Certain exemplary embodiments of the present invention include a chemical injection management system that addresses one or more of the above-mentioned inadequacies of conventional chemical injection management systems. Some embodiments may include a flow regulator that includes one or more non-invasive flow meters, such as ultrasonic flow meters. The use of non-invasive flow meters in the chemical injection management system may minimize the need for frequent tuning and/or replacement of the flow meters. In particular, since non-invasive flow meters may generally include fewer moving mechanical parts, the extent of mechanical wear over time may be minimized. As such, the non-invasive flow meters may experience longer life cycles and may maintain measurement accuracy longer than other types of flow meters.

In some embodiments, the flow regulator may also be configured to exercise direct, feed-forward control of a valve, without using a nested valve-positioning feedback control loop. As explained below, flow regulators exercising feed-forward control of the valve may remain accurate over longer periods of time than systems exercising feedback control, which relies on system constants that may not be appropriate when valve components have worn or other conditions have changed.

Additionally, or alternatively, some embodiments may immerse components of the chemical injection management system in a protective fluid, such as oil, to reduce wear on moving components and potentially extend their useful life. To this end, some embodiments may have a sealed housing to contain the protective fluid and a pressure equalizer to reduce hydrostatic loads in sub-sea applications, as explained below. Prior to addressing these features in detail, aspects of a system that may employ such a chemical injection management system are discussed.

FIG. 1 depicts an exemplary resource extraction system 10 that may include a well 12, what is colloquially referred to as a "christmas tree" 14 (hereinafter, a "tree"), a chemical injection management system 16, and a valve receptacle 18. The illustrated resource extraction system 10 can be configured to extract hydrocarbons (e.g., oil and/or natural gas). In some embodiments, the resource extraction system 10 may be land-based or disposed a sub-sea, and/or configured to extract or inject other substances, such as those discussed above.

When assembled, the tree 14 may couple to the well 12 and include a variety of valves, fittings, and controls for operating the well 12. The chemical injection management system 16 may be coupled to the tree 14 by the valve receptacle 18. The tree 14 may place the chemical injection management system (C.I.M.S.) 16 in fluid communication with the well 12. As explained below, the chemical injection management system 16 may be configured to regulate the flow of a chemical through the tree 14 and into the well 12.

Figure 2:
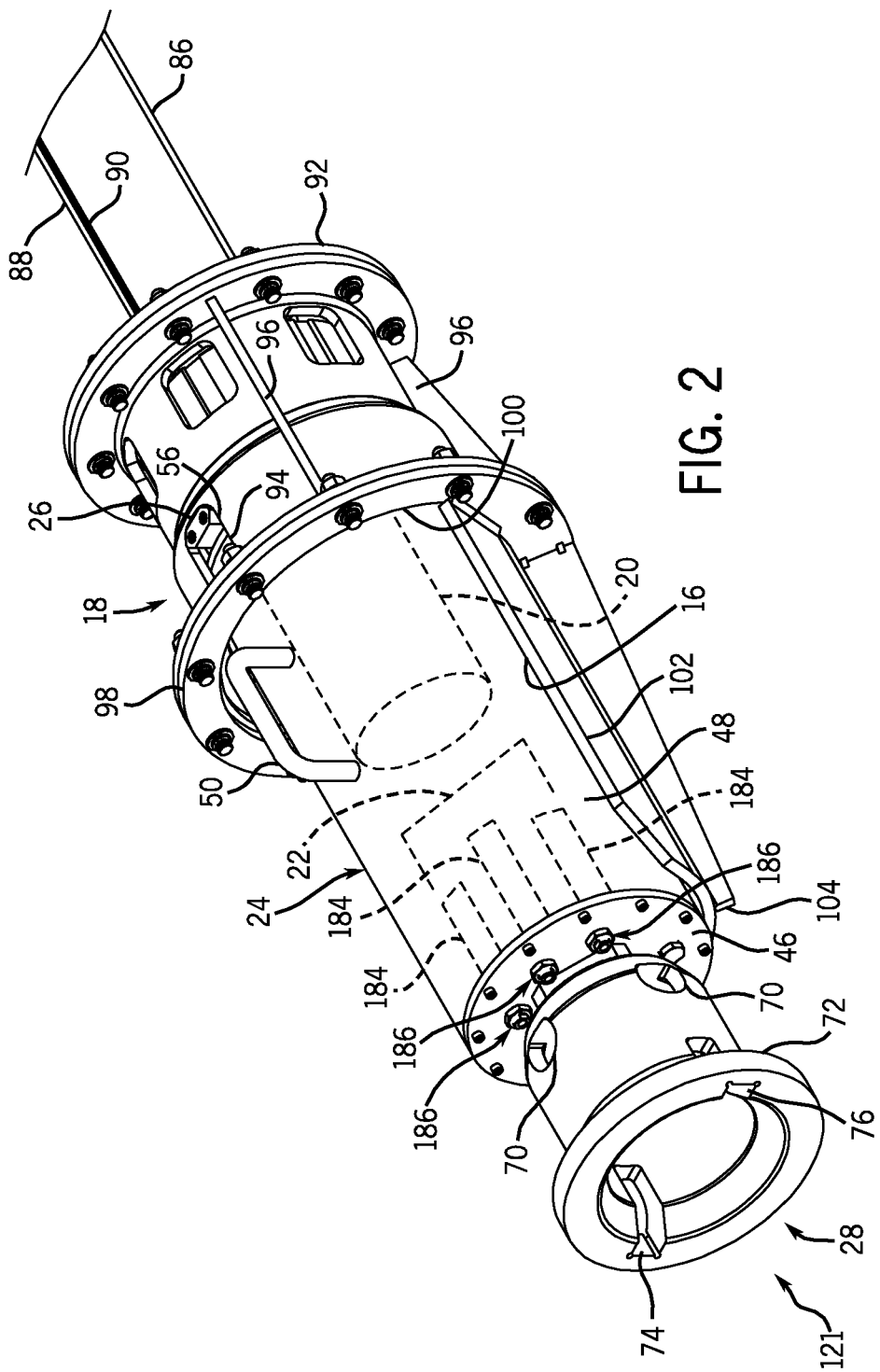
FIG. 2 is a partial perspective view of the resource extraction system of FIG. 1 that depicts an exemplary chemical injection management system and a valve receptacle in accordance with an embodiment of the present technique.

FIG. 2 is a perspective view of the chemical injection management system 16 mated with the valve receptacle 18. As illustrated, the chemical injection management system 16 may include a flow regulator 20, a pressure equalizer 22, a housing 24, a tree interface 26, and an ROV (remotely operated vehicle) interface 28. As described in reference to FIGS. 5-8, the flow regulator 20 may include components that reduce the likelihood of the flow regulator 20 losing accuracy over time. Furthermore, the pressure equalizer 22 may facilitate the inclusion of a protective fluid, which is believed to extend the life of moving components within the housing 24. Prior to addressing these features in detail, other components of the chemical injection management system 16 are discussed.

Figure 3:
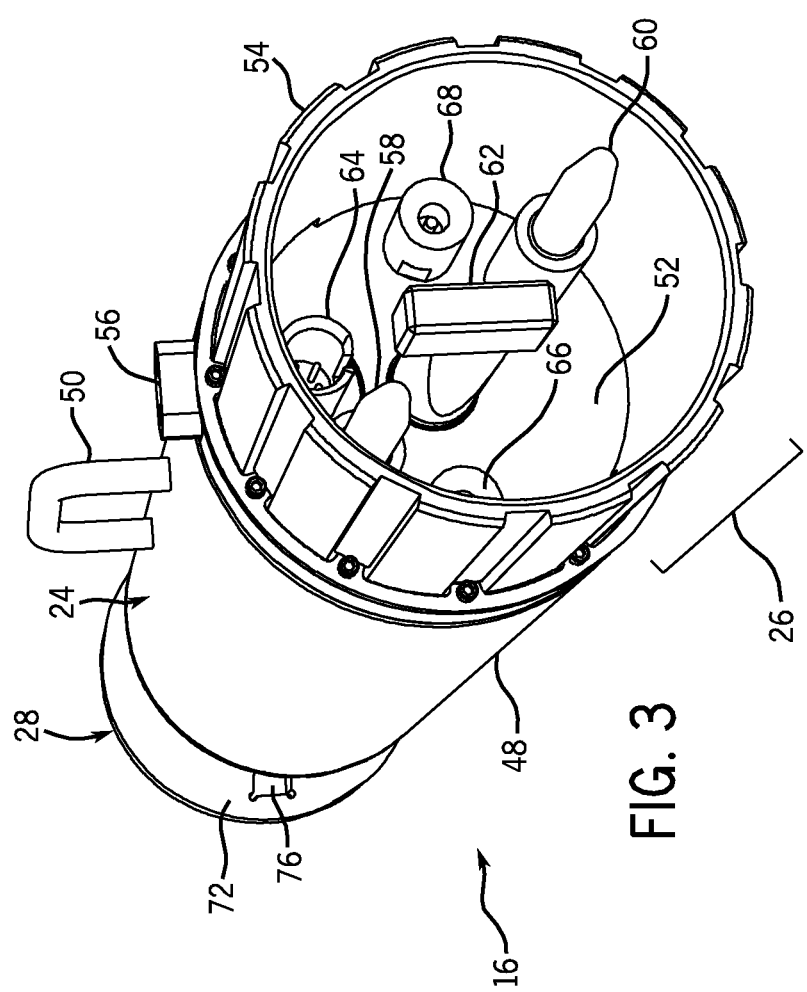
FIG. 3 is a rear-perspective view of the chemical injection management system of FIG. 2.

With reference to FIGS. 2 and 3, the housing 24 may include an outer-end plate 46, a side wall 48, a handle 50, an inner-end plate 52, and a tree-interface shield 54. The side wall 48 and end plates 46 and 52 may be made from a generally rigid, corrosion-resistant material and may generally define a right cylindrical volume with a circular base. The tree-interface shield 54 may extend from the side wall 48 beyond the inner-end plate 52. The handle 50 may be affixed (for example, welded) to the side wall 48 and may have a U-shape. Some embodiments may include additional handles 50.

As illustrated by FIG. 3, the tree interface 26 may include a key 56, guide pins 58 and 60, a latch 62, an electrical connector 64, a fluid-inlet connector 66, and a fluid-outlet connector 68. In the present embodiment, with the exception of the key 56, the components of the tree interface 26 may be generally disposed within the tree-interface shield 54. These components may be configured to electrically, fluidly, and/or mechanically couple the chemical injection management system 16 to the tree 14 via complementary components on the valve receptacle 18, as explained below after discussing the ROV interface 28.

The ROV interface 28 will now be described with reference to FIGS. 2 and 5. The illustrated ROV interface 28 may include apertures 70, a flared grip 72, slots 74 and 76, and a torque-tool interface 78. In some embodiments, the ROV interface 28 may be an API 17D class 4 ROV interface. The ROV interface 28 may be attached to the outer-end plate 46. The torque-tool interface 78, which may be configured to couple to a torque tool on an ROV, may be disposed within the flared grip 72 and generally symmetrically between the slots 74 and 76.

Figure 5:
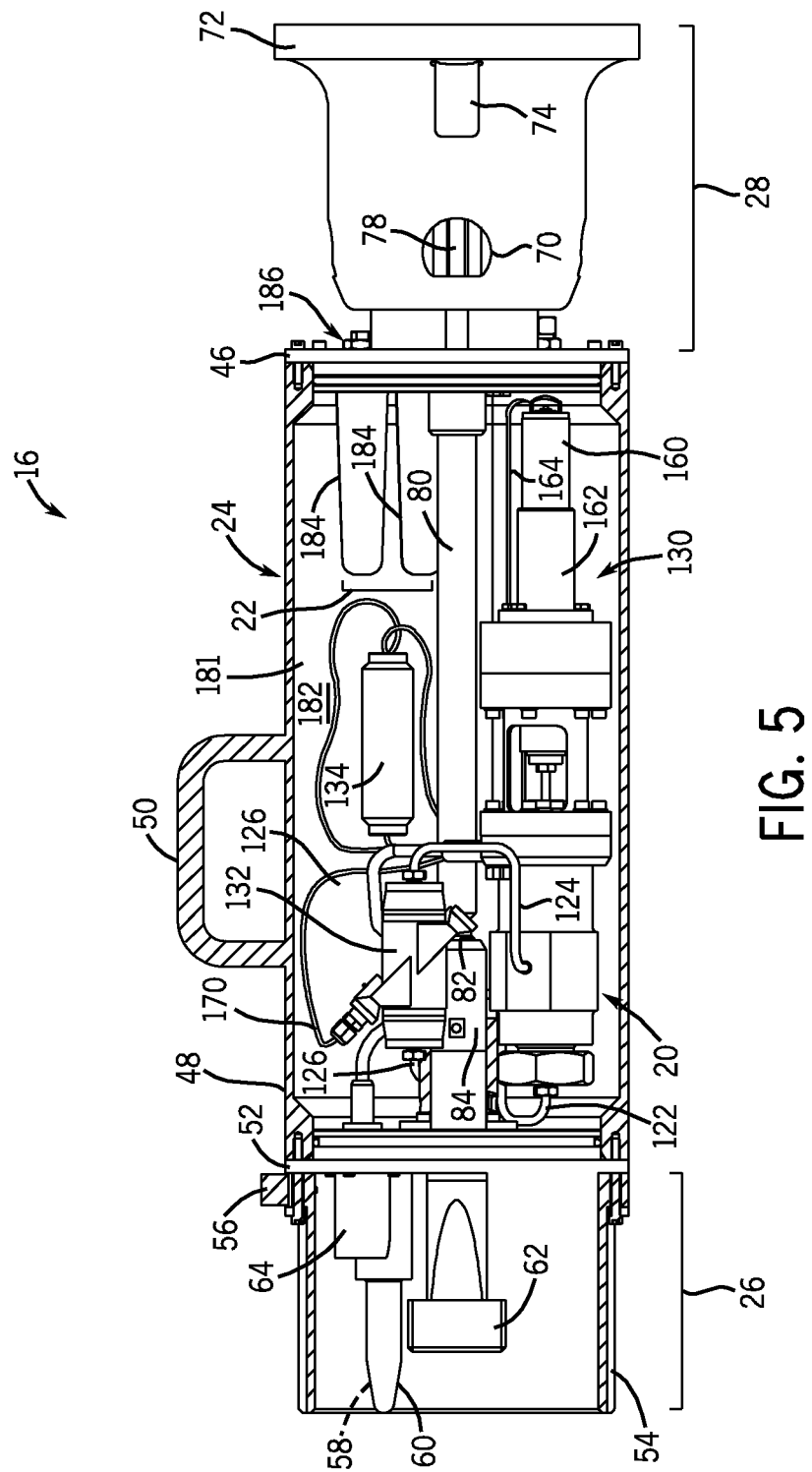
FIG. 5 is a cutaway view of the chemical injection management system of FIG. 2.

As illustrated by FIG. 5, the torque-tool interface 78 may be coupled to an internal drive mechanism that includes a driveshaft 80, a threaded coupling 82, and a cam 84 that is linked to the latch 62. The operation of these components will be described after discussing features of the valve receptacle 18.

Figure 4:
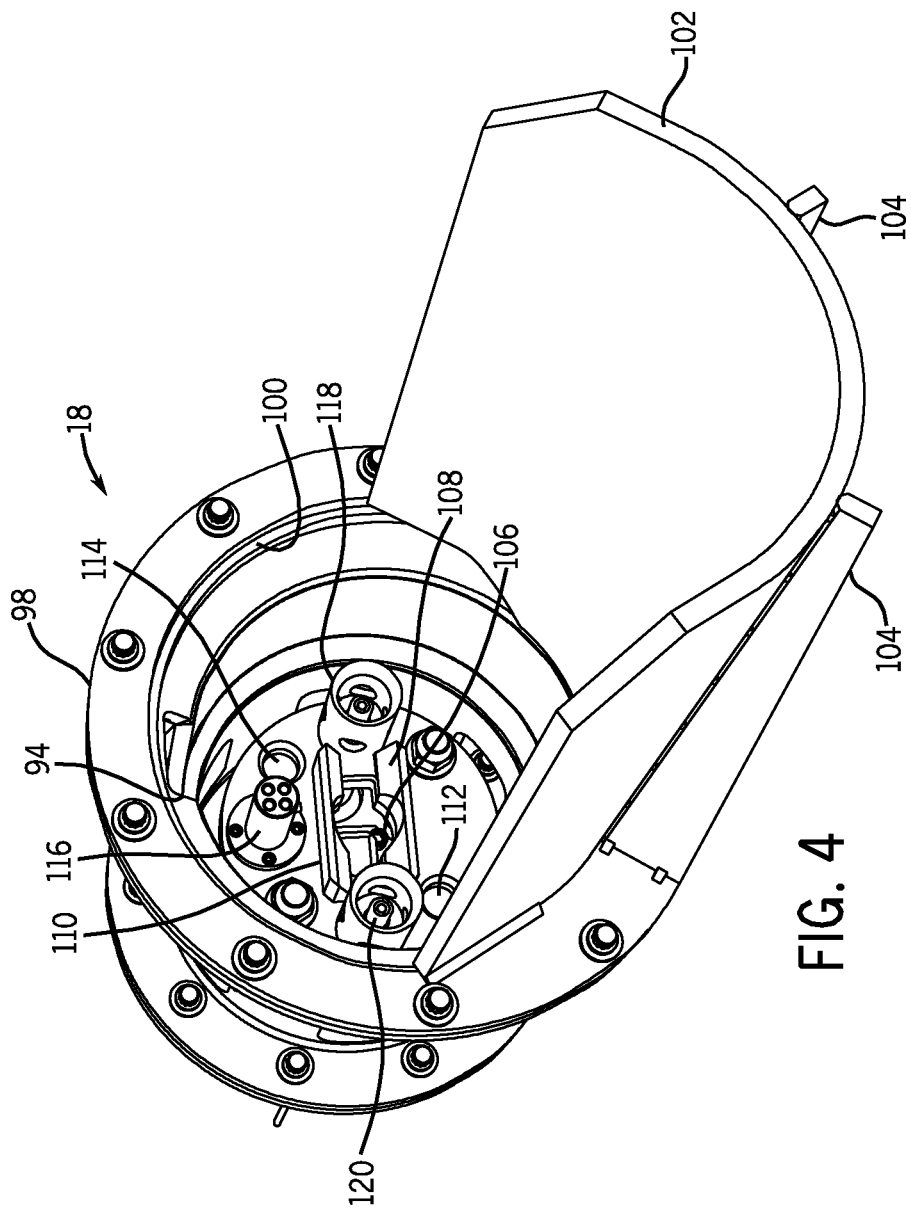
FIG. 4 is a perspective view of the valve receptacle of FIG. 2.

FIGS. 2 and 4 illustrate the exemplary valve receptacle 18. Starting with the features depicted by FIG. 2, the valve receptacle 18 may include a fluid inlet 86, a fluid outlet 88, an electrical connection 90, a mounting flange 92, a keyway 94, support flanges 96, an outer flange 98, a valve aperture 100, a valve tray 102, and tray supports 104. The fluid inlet 86 may be a fluid conduit, tube, or pipe that is in fluid communication with a fluid source, such as a supply of a liquid to be injected, and the fluid outlet 88 may be a fluid conduit, tube, or pipe that is in fluid communication with the well 12. The electrical connection 90 may couple to a power source, a user input device, a display, and/or a system controller. The mounting flange 92 may be configured to couple the valve receptacle 18 to the tree 14. The keyway 94 and the valve tray 102 may be configured to at least roughly align the chemical injection management system 16 to the valve receptacle 18 during installation of the chemical injection management system 16. Specifically, the valve support tray 102 may be configured to support the chemical injection management system 16 as it slides into the valve aperture 100, and the key 56 may be configured to slide into the keyway 94 to rotationally position the chemical injection management system 16.

Turning to the features illustrated by FIG. 4, the valve receptacle 18 may include a slot 106, lead-in chamfers 108 and 110, chamfered apertures 112 and 114, a complementary electrical connector 116, a complementary fluid-inlet connector 118, and a complementary fluid-outlet connector 120. In the present embodiment, these components may be disposed within the valve aperture 100. The lead-in chamfers 108 and 110 and the slot 106 may be configured to align and receive the latch 62 from the chemical injection management system 16, and the chamfered apertures 112 and 114 may be configured to receive the guide pins 58 and 60, respectively. Additionally, the complementary fluid-inlet connector 118 may be configured to fluidly couple the fluid inlet 86 to the fluid-inlet connector 66, and the complementary fluid-outlet connector 120 may be configured to fluidly couple the fluid outlet 88 to the fluid-outlet connector 68. The complementary electrical connector 116 may be configured to electrically couple the electrical connector 64 on the chemical injection management system 16 to the electrical connection 90.

During installation, the chemical injection management system 16 may be secured to an ROV above or near the surface of the ocean, e.g., on a support structure or vessel. The ROV may then submerge and convey the chemical injection management system 16 to the tree 14 and place it on the valve tray 102. The ROV may rotate the chemical injection management system 16 to align the key 56 with the keyway 94. The ROV may then drive the chemical injection management system 16 forward into the valve aperture 100, as indicated by arrow 121 in FIG. 2. As the chemical injection management system 16 moves forward, the guide pins 58 and 60 may mate or cooperate with the chamfered apertures 112 and 114 to further refine the alignment of the chemical injection management system 16. With further forward movement, the latch 62 may be inserted through the slot 106 with the aid of the lead in chamfers 108 and 110.

To form the electrical and fluid connections, a torque tool on the ROV may then rotate the torque-tool interface 78, which may rotate the driveshaft 80 within the cam 84. The cam 84 may transmit approximately the first 90° of rotation of the driveshaft 80 into rotation of the latch 62, thereby positioning the latch 62 out of alignment with the slot 106 and generally preventing the latch 62 from being pulled back through the slot 106. After 90° of rotation, the cam 84 may generally cease transmitting rotation of the driveshaft 80, and the threaded coupling 82 may convert rotation of this driveshaft 80 into a linear translation or pulling of the latch 62 back towards the housing 24. However, because the latch 62 is out of alignment with the slot 106, it may be generally prevented from moving backwards by the valve receptacle 18. As the latch 62 is pulled backwards, the chemical injection management system 16 may gradually translate forward, and the electrical and fluid connections may be formed. Finally, the ROV may disengage from the chemical injection management system 16 and return to the surface.

Figure 6:
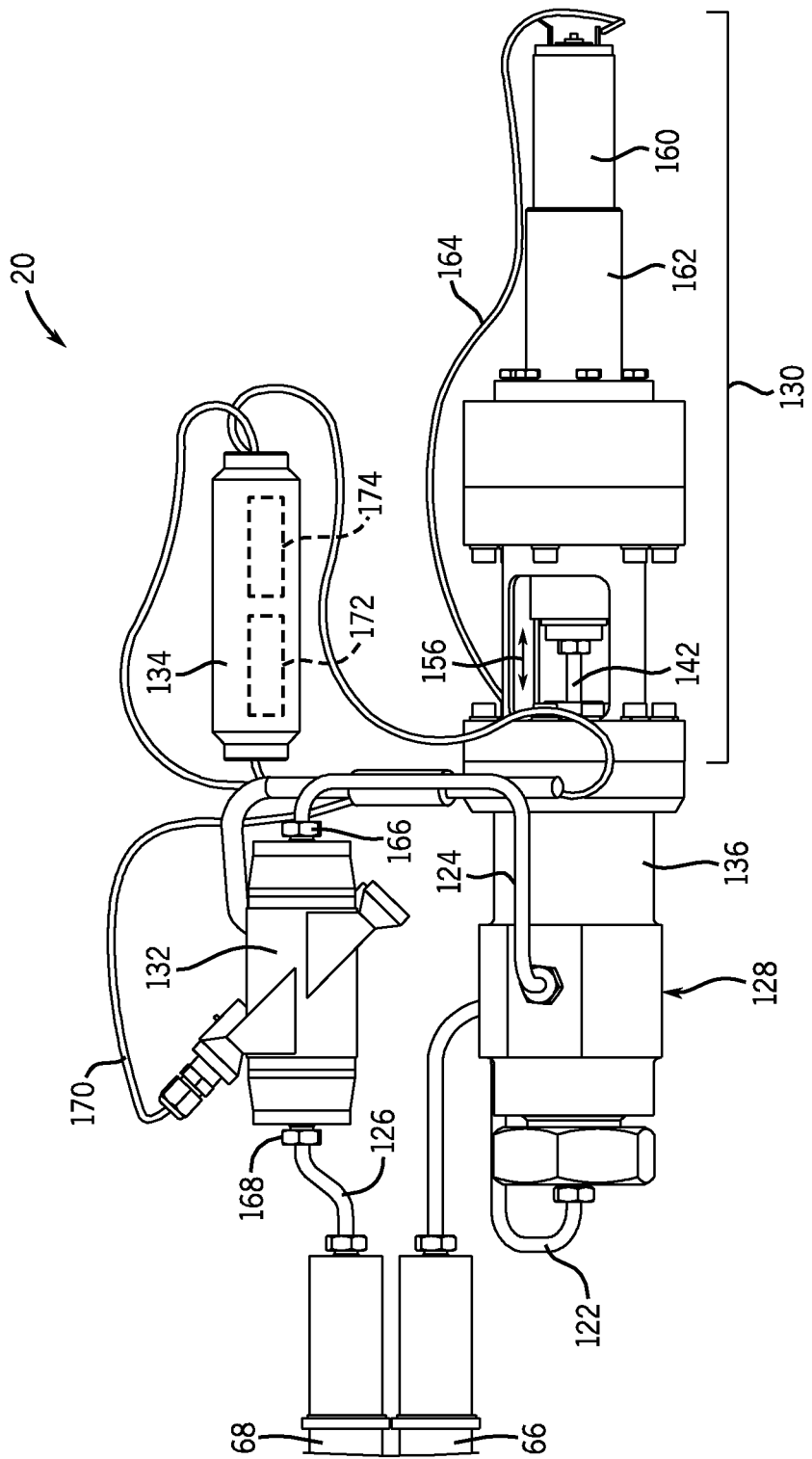
FIG. 6 is a side-view of an exemplary flow regulator in accordance with an embodiment of the present technique.
Figure 7:
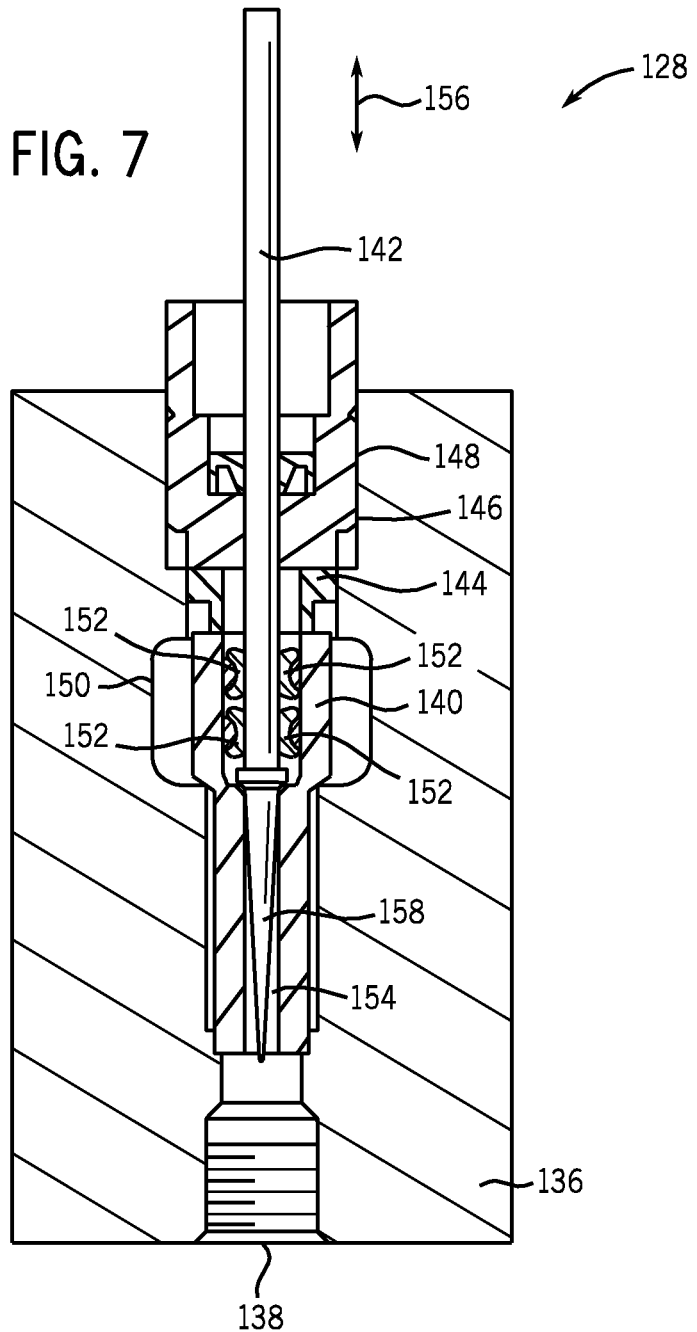
FIG. 7 is a cross-sectional view of an exemplary valve in accordance with an embodiment of the present technique.
Figure 8:
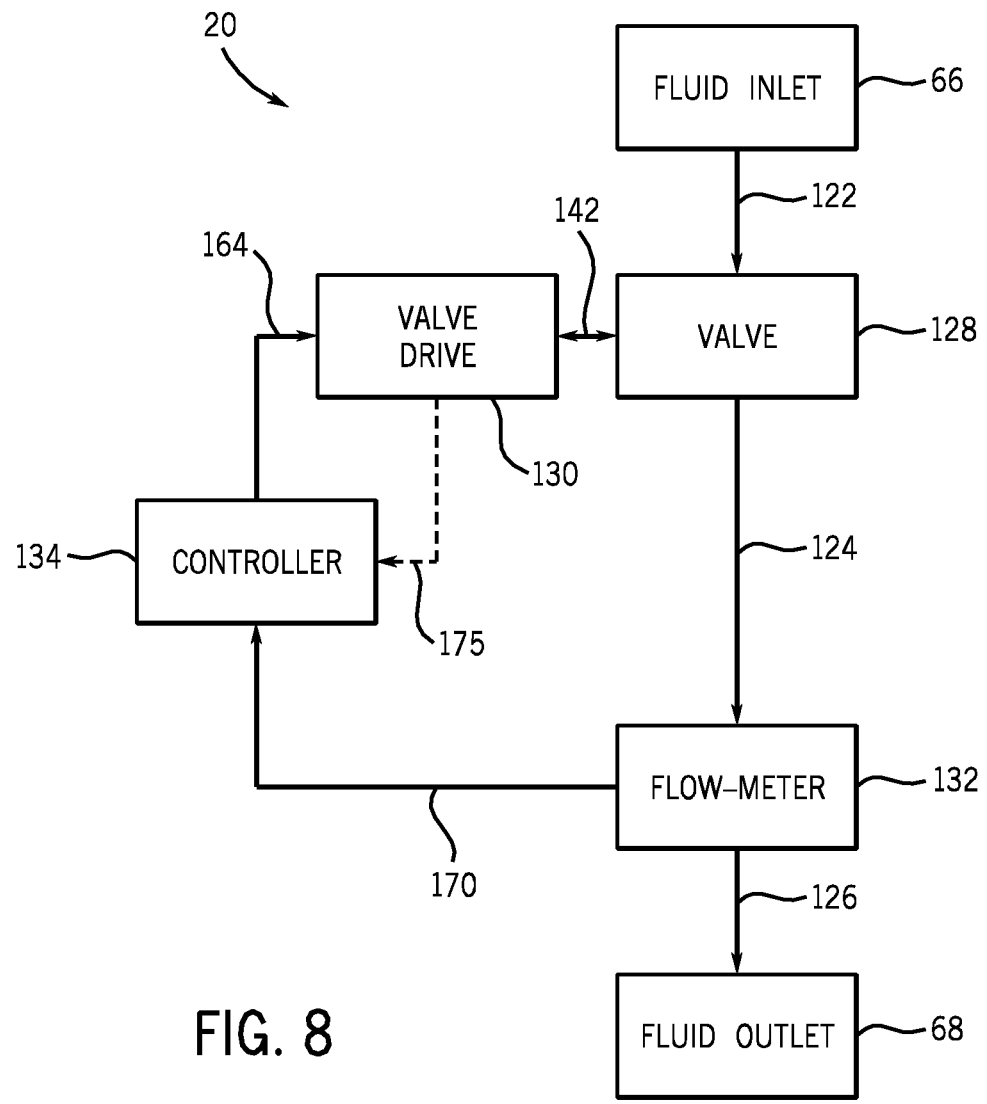
FIG. 8 is a diagrammatic view of the flow regulator of FIG. 6.

Features of the flow regulator 20 will now be described with reference to FIGS. 5-8. FIG. 5 illustrates the flow regulator 20 within a cutaway portion of the housing 24, and a FIG. 6 illustrates the flow regulator 20 in isolation. FIG. 7 is a cross-sectional view of a valve that may be employed in the flow regulator 20, and FIG. 8 is a diagrammatic representation of the flow regulator 20.

Turning to FIG. 6, flow regulator 20 may include fluid conduits 122, 124, and 126, a valve 128, a valve drive 130, a flow meter 132, and a controller 134. As explained below, the flow regulator 20 may be configured to regulate or control a flow parameter, such as a volumetric flow rate, a mass flow rate, a volume, and/or a mass of fluid flowing into the well 12.

Features of the exemplary valve 128 are depicted in the cross-sectional view of FIG. 7. The valve 128 may include a body 136, a threaded inlet 138, a needle seat 140, a needle 142 seals 144, 146, and 148, and an outlet manifold 150. The illustrated needle seat 140 may include apertures 152 and a narrowed fluid path 154. The needle 142 may be configured to linearly translate through the body 136, as indicated by arrow 156, and may include a tapered tip 158 disposed generally within the needle seat 140.

In operation, a fluid may flow in through the threaded inlet 138, pass through the needle seat 140, and flow out of the valve 128 through conduit 124, which may be coupled to be outlet manifold 150. The needle 142 may be moved as indicated by arrow 156 to control the flow rate through the valve 128. As the needle 142 is withdrawn or moved upwards, a gap between the tapered tip 158 and the narrowed fluid path 154 of the needle seat 140 may expand, and the flow rate may increase. Conversely, as the needle 142 is driven into the body 136 or moved downwards, the gap between the tapered tip 158 and the narrowed fluid path 154 may decrease, and the flow rate through the valve 128 may decrease. That is, the flow rate through the valve 128 may generally correspond with the position of the needle 142. The valve 128 may have a turndown ratio greater than or equal to 100:1, and some embodiments may include two or more valves 128 that are each sized for different flow rates.

Returning to FIG. 6, the illustrated valve drive 130 may include a motor 160, a gearbox 162, and a control signal path 164. The motor 160 may have a direct-current (DC) motor, for instance, a 24 volt DC electric motor with. In certain embodiments, the gearbox 162 includes a high power ratio planetary gearbox with a gear ratio in excess of 600:1. In some embodiments, these components 160 and 162 may be immersed in an oil-filled environment, as explained below. Advantageously, such an environment may tend to reduce wear on these components 160 and 162.

The flow meter 132 may include a fluid inlet 166, a fluid outlet 168, and a measurement signal path 170. In some embodiments, the flow meter 132 may be an ultrasonic flow meter, as described in greater detail below with respect to FIGS. 11 and 14. That is, the flow meter 132 may be configured to measure a flow rate or amount of fluid by transmitting acoustic energy along one or more paths through which the fluid flows. The flow meter 132 may be generally free of bearings and other mechanical components and generally chemically resistant. Additionally, in some embodiments, the flow meter 132 may be rated for pressures greater than the 5 kilopounds per square inch (ksi), 10 ksi, 15 ksi, or 20 ksi.

The controller 134 may include a processor 172 and memory 174. The controller 134 may be configured to determine a volumetric flow rate, a mass flow rate, a volume, or a mass based on a signal from the flow meter 132. The controller 134 may also be configured to regulate or control one or more of these parameters based on the signal from the flow meter 132 by signaling the motor 160 to adjust the position of the needle 142. To this end, the controller 134 may include software and/or circuitry configured to execute a control routine, such as a proportional-integral-differential (PID) control routine. In some embodiments, the control routine and/or data based on the signal from the flow meter 132 may be stored in memory 174 or another computer-readable medium.

FIG. 8 is a diagrammatic representation of the flow regulator 20. Starting with the connections configured to convey fluids, the fluid-inlet connector 66 may be fluidly coupled to the threaded inlet 138 of the valve 128 by fluid conduit 122. The fluid outlet manifold 150 of the valve 128 may be fluidly coupled to the fluid inlet 166 of the flow meter 132 by the fluid conduit 124. Additionally, the fluid outlet 168 of the flow meter 132 may be fluidly coupled to the fluid-outlet connector 68 by fluid conduit 126. Turning to the connections configured to convey information, data, and/or control signals, the controller 134 may be communicatively coupled to the flow meter 132 by measurement signal path 170 and to the valve drive 130 by control signal path 164. Additionally, the controller 134 may be communicatively coupled to the electrical connector 64 for communication with other components of the resource extraction system 10 and for a source of power. The needle 142 mechanically links the valve drive 130 and the valve 128.

In operation, the controller 134 may exercise feedback control over fluid flow through the flow regulator 20. The controller 134 may transmit a control signal to the valve drive 130. The content of the control signal may be determined by, or based on, a comparison between a flow parameter (e.g., a volumetric flow rate, a mass flow rate, a volume, or a mass) measured by the flow meter 132 and a desired value of the flow parameter. For instance, if the controller 134 determines that the flow rate through the flow regulator 20 is less than a desired flow rate, the controller 134 may signal the valve drive 130 to withdraw the needle 142 some distance. In response, the motor 160 may drive the gearbox 162, and the gearbox 162 may convert rotational movement from the motor 160 into linear translation of the needle 142. As a result, in some embodiments, the flow rate through the valve 128 may increase as the gap between the tapered tip 158 of the needle 142 and the narrowed fluid path 154 of the needle seat 140 increases. Alternatively, if the controller 134 determines that the flow rate (or other flow parameter) through the flow regulator 20 is greater than a desired flow rate (or other flow parameter), the controller 134 may signal the valve drive 130 to drive the needle 142 some distance into the valve 128, thereby potentially decreasing the flow rate. In other words, the controller 134 may signal the valve drive 130 to move the needle 142 some distance based on a flow parameter sensed by the flow meter 132.

To control the flow parameter, the controller 134 may exercise feedback and/or feed-forward control of the valve drive 130. For instance, in some embodiments, the controller 134 may receive a drive feedback signal 175 that is indicative of, or correlates with, the position of the needle 142. Using the drive feedback signal 175, the controller 134 may exercise feedback control over the position of the needle 142. That is, the controller 134 may send a control signal 164 that is determined, at least in part, by a comparison between the drive feedback signal 175 and a desired needle position. The desired needle position may be determined by a table, equation, and/or relationship stored in memory 174 that correlates needle position with flow rate through the valve 128. Embodiments employing feedback control over both the position of the needle 142 and the flow parameter may be characterized as having a nested control loop, e.g., a feedback control loop directed toward controlling the needle position nested within a feedback control loop directed towards controlling the flow parameter.

Some embodiments may not include a nested control loop or may employ a nested control loop in a more limited fashion. For instance, in some embodiments, the controller 134 may not receive the drive feedback signal 175 or may partially or entirely disregard the drive feedback signal 175. In certain embodiments, the controller 134 may exercise feed-forward control over the position of the needle 142. That is, the controller 134 may transmit control signal 164 to the valve drive 130 based on a difference between a desired flow parameter value and a measured flow parameter value, regardless of a current position of the needle 142. In other words, some embodiments may not rely on a stored correlation between needle position and flow rate through the valve 128. For instance, in operation, the controller 134 may determine that the current volumetric flow rate through the flow regulator 20 is less than the desired volumetric flow rate and, in response, signal the valve drive 130 to shift the position of the needle 142 some distance. In some embodiments, the controller 134 may determine this distance without regard to the current position of the needle 142.

Advantageously, embodiments without a nested control loop may control flow parameters more accurately over a longer period of time and under a wider variety of circumstances than conventional systems. Because some embodiments do not rely on a correlation between the position of the needle 142 and a flow rate through the valve 128, they may be more robust in the face of changing conditions. For example, the tapered tip 158 of the needle 142 or the narrowed fluid path 154 of the needle seat 140 may wear and change the relationship between the position of the needle 142 and the flow rate through the valve 128. Such a change could introduce error when exercising feedback control of the position of the needle 142. In some circumstances, this error could decrease the responsiveness, stability, or accuracy of the flow regulator 20. In contrast, embodiments without a nested control loop for controlling the position of the needle 142 may be affected less by these sources of error.

Other features of the chemical injection management system 16 may tend to extend its useful life. For example, returning to FIG. 5, an interior 181 of the housing 24 may be partially or substantially entirely filled with a protective fluid 182, such as oil. In some embodiments, the protective fluid 182 may be hydraulic gear oil. Advantageously, the protective fluid 182 may lubricate and/or tend to reduce wear on components inside the housing 24, such as the driveshaft 80, the cam 84, the threaded coupling 82, and/or the valve drive 130. To maintain separation of seawater and the protective fluid 182, the housing 24 may be substantially watertight. In some sub-sea applications, a difference in pressure between the protective fluid 182 and surrounding seawater may exert a hydrostatic load on the housing 24. To reduce this load, the chemical injection management system 16 may include a pressure equalizer 22.

Features of the exemplary pressure equalizer 22 will now be described with reference to FIGS. 2, 5, 9, and 10. As illustrated by FIGS. 2 and 5, the pressure of equalizer 22 may include one or more bladders 184 and fittings 186. The pressure equalizer 22 may extend inward into the housing 24 from the outer-end plate 46. Some embodiments may include 1, 2, 3, 4, 5, or more bladders.

Figure 9:
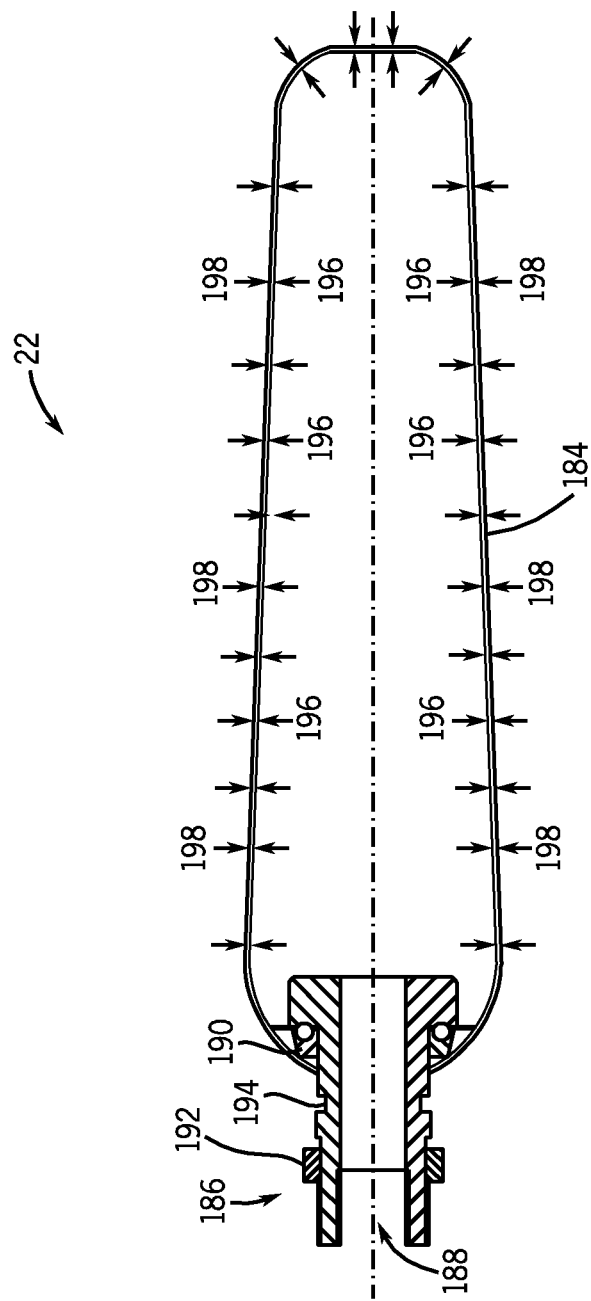
FIG. 9 is a cross-sectional view of an exemplary pressure equalizer in accordance with an embodiment of the present technique.

FIG. 9 illustrates a cross-sectional view of the exemplary pressure equalizer 22. The bladder 184 may be made of a resilient and/or watertight material, such as rubber, neoprene, vinyl, or silicone. The bladder 184 may have a generally cylindrical shape and couple to the fitting 186 at one end.

The illustrated fitting 186 may include a water inlet 188, sealing members 190 and 192, and an O-ring seat 194. The water inlet 188 may extend through the fitting 186 and provide a fluid passage into the bladder 184. The sealing member 190 may seal the bladder 184 to the fitting 186. The sealing member 192 and O-ring seat 194 may cooperate with an aperture in the outer-end plate 46 to secure the fitting 186 to the outer-end plate 46 and form a generally watertight seal with the outer-end plate 46. In some embodiments, the fitting 186 may include threads that cooperate with complementary threads on the outer-end plate 46 and/or a threaded nut disposed outside of the outer-end plate 46.

In operation, the pressure equalizer 22 may tend to reduce a difference in pressure between the protective fluid 182 and surrounding water pressure. The forces from surrounding water pressure on the bladder 184 are depicted by arrows 196 in FIG. 9, and the forces from the pressure of the protective fluid 182 are illustrated by arrows 198. If the water pressure 196 is greater than the pressure of the protective fluid 198, the bladder 184 may expand and/or apply a force to the protective fluid 182 and increase the pressure 198 of the protective fluid 182, thereby potentially reducing the pressure differential. In some embodiments, the protective fluid 182 may be substantially incompressible and the bladder 184 may primarily transmit a force rather than expand to equalize pressure.

Some embodiments may include other types of pressure equalizers 22, such as a piston disposed within a cylinder that is in fluid communication with the protective fluid 182 and surrounding seawater on respective opposite sides of the piston. In another example, the pressure equalizer 22 may include a resilient or less rigid portion of the housing 24 that is configured to transmit a force to the protective fluid 182.

Figure 10:
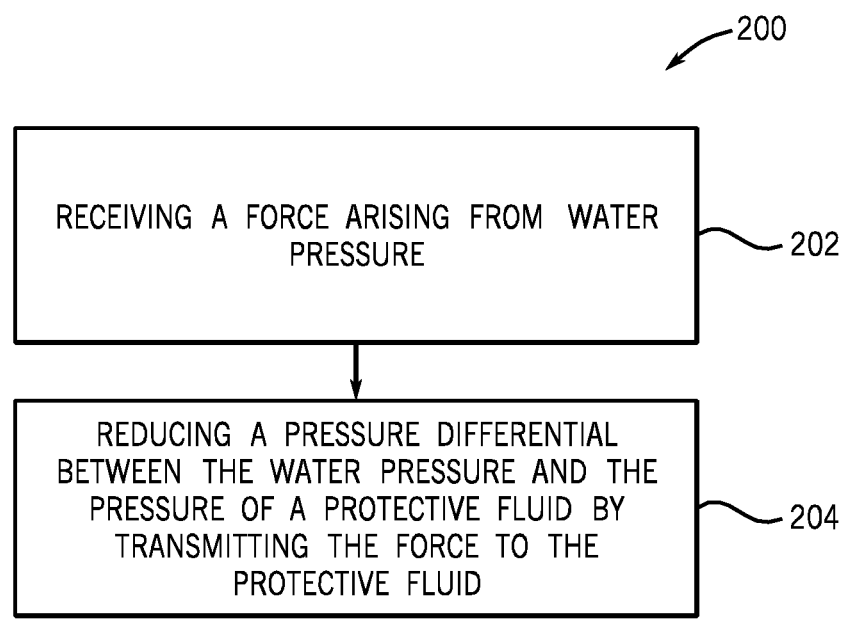
FIG. 10 is a flowchart depicting an exemplary pressure equalization process in accordance with an embodiment of the present technique.

FIG. 10 illustrates an exemplary pressure equalization process 200. The process 200 may include receiving a force arising from water pressure, as indicated by block 202, and/or reducing a pressure differential between the water pressure and the pressure of a protective fluid by transmitting the force to the protective fluid, as indicated by block 204. Reducing the pressure differential may include substantially eliminating the pressure differential or substantially reducing the magnitude of the pressure differential. In some land-based applications, the process 200 may include receiving a force arising from air pressure and transmitting the force to the protective fluid.

As described above, the flow meter 132 of the flow regulator may be an ultrasonic flow meter. In general, ultrasonic flow meters measure the transit time of ultrasonic energy pulses traveling with or against the flow of a fluid being measured. More specifically, ultrasonic flow meters generally include at least one pair of transducers on opposite sides of a measurement pipe through which the fluid flows.

Figure 11:
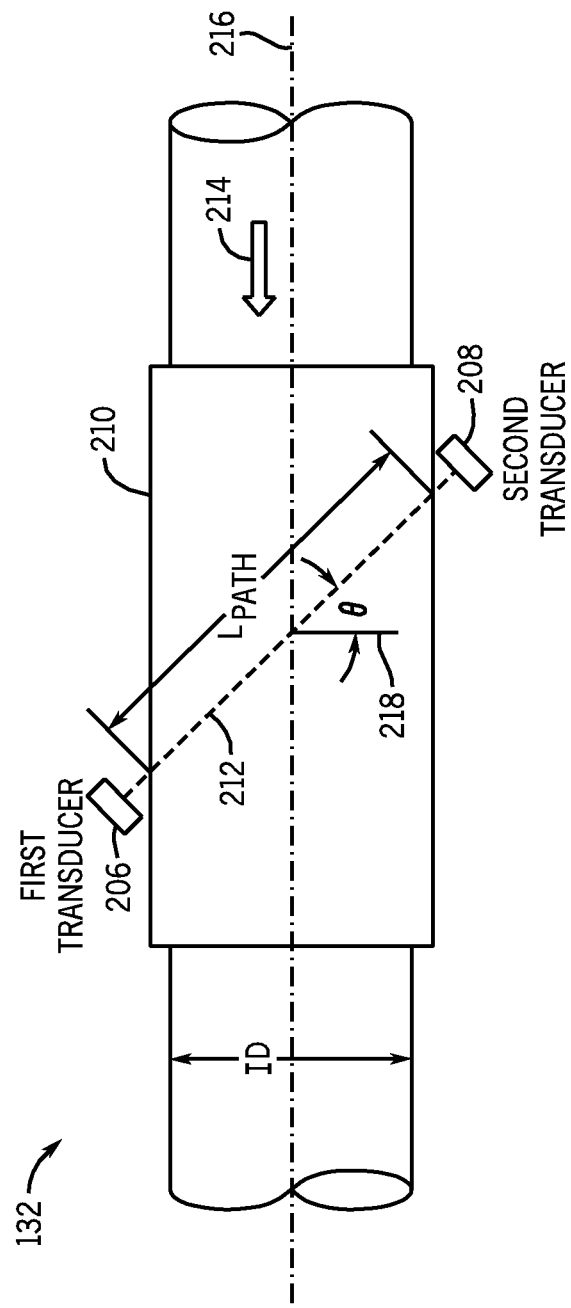
FIG. 11 is a cross-sectional diagrammatic representation of an exemplary ultrasonic flow meter used with the flow regulator in accordance with an embodiment of the present technique.

For instance, FIG. 11 is a cross-sectional diagrammatic representation of an exemplary ultrasonic flow meter 132 used with the flow regulator 20. As illustrated, a first transducer 206 and a second transducer 208 are located on opposite sides of a measurement pipe 210. In particular, the first transducer 206 and the second transducer 208 may form an acoustic path 212 across the fluid flow path 214. As illustrated, the acoustic path 212 may, for example, form a diagonal line across a longitudinal axis 216 of the measurement pipe 210. More specifically, the acoustic path 212 may form an angle of θ between the acoustic path 212 and a line perpendicular to the longitudinal axis 216.

The ultrasonic flow meter 132 of FIG. 11 may transmit acoustic energy along the acoustic path 212 (i.e., from the first transducer 206 to the second transducer 208) through the measurement pipe 210 within which the fluid flows. More specifically, the first transducer 206 may be excited by a burst of electrical energy. This may cause a pulse of acoustic energy into the adjacent medium. In certain embodiments, the ultrasonic pulse may consist of several cycles having a frequency in the range of 0.05 to 3 megahertz (mHz). The transducers 206, 208 are generally designed to be directional. In other words, a significant portion of the acoustic energy will travel along the acoustic path 212 from the first transducer 206 to the second transducer 208. The elapsed time from the time of transmission from the first transducer 206 to the time of detection by the second transducer 208 may be measured.

Conversely, the second transducer 208 may also be excited by a burst of electrical energy. This may cause another pulse of acoustic energy into the adjacent medium. Again, a significant portion of the acoustic energy will travel along the acoustic path 212 from the second transducer 208 to the first transducer 206. The elapsed time from the time of transmission from the second transducer 208 to the time of detection by the first transducer 206 may also be measured. Each energy pulse traverses at least substantially or exactly the same acoustic path 212. Therefore, the difference in the transit times, as well as the particular geometries of the measurement pipe 210 (e.g., the inner diameter (ID)) and the acoustic path 212 (e.g., the angle θ), may be used to calculate fluid velocity and volumetric flow rate of the fluid.

In addition, although illustrated in FIG. 11 as utilizing an acoustic path 212 with an angle θ of approximately 45 degrees, the angle θ of the acoustic path 212 may vary depending on specific parameters of the ultrasonic flow meter 132 (e.g., operating conditions, space constraints, and so forth). For instance, the angle θ may be 0 degrees (i.e., perpendicular to the longitudinal axis 216), 15 degrees, 30 degrees, 45 degrees, and so forth. Indeed, as explained in further detail below with respect to FIG. 14, the angle θ may be as great as 90 degrees, such as when the transducers 206, 208 are placed at opposite ends of the fluid flow path 214. In addition, in certain embodiments, a plurality of paired transducers 206, 208 may be used at varying angles θ, such that multiple sets of measurement data may be collected by the ultrasonic flow meter 132. Also, in certain embodiments, a plurality of paired transducers 206, 208 may be located radially around the circumference of the measurement pipe 210, such that multiple sets of measurement data may be collected by the ultrasonic flow meter 132.

In addition, although described herein as an ultrasonic flow meter 132, the flow meter 132 may indeed use any suitable type of sonic energy and any suitable type of sound probes. In fact, the flow meter may employ any suitable non-invasive techniques. For instance, thermal-based non-invasive flow meters may be used, such as where a specific amount of heat is introduced into the fluid flow and the temperature distribution through the fluid may be used to determine characteristics, such as velocity, of the fluid flow. In addition, optical based non-invasive flow meters may also be used. In this type of flow meter, beams of light may be shown through the fluid flow and the manner in which the light scatters through the fluid flow may lead to determinations of characteristics of the fluid flow. In addition, other various non-invasive techniques (e.g., magnetic resonance, and so forth) may also be utilized.

The use of ultrasonic flow meters within the flow regulator 20 may lead to several benefits. For example, other types of flow metering devices may require filters since they generally have a lower tolerance for particulates. This is due, at least in part, to the complexity of the mechanical components within these flow metering devices. For instance, since there is only a limited amount of space within the chemical injection management system 16, these mechanical flow metering devices may often contain small restrictions (e.g., from small moving parts, seals, and so forth) and, as such, may be very sensitive to particulates in the fluid. However, when using ultrasonic flow meters, there is potentially less of a need for filtration as ultrasonic flow meters generally do not have as many small restrictions since flow measurement is accomplished via acoustic energy instead of mechanical components. As such, acoustic flow meters may have a generally high tolerance to particulates, gels, and semi-solid and solid bodies, which may be carried along within the fluid being measured.

In addition, concerns about chemicals attacking the metering elements may be minimized due to the fact that there are fewer mechanical components in ultrasonic flow meters. More particularly, since the ultrasonic flow meter 132 may generally include little more than a simple tube construction, minimal moving parts or seals are required. More specifically, since the transducers 206, 208 may be located external to the measurement pipe 210, the transducers 206, 208 may be isolated from the actual fluid flow. As such, these main measurement components of the ultrasonic flow meter 132 are not subject to corrosion or chemical attack. In addition, corrosive resistant materials may also be used for the tube construction, further limiting potentially adverse affects of chemicals attacking the ultrasonic flow meter 132.

One particular fluid that may be measured by the ultrasonic flow meter 132 is the mono ethylene glycol (MEG), which may be circulated through the chemical injection management system 16. In general, the MEG is a glycol which may be re-cycled through the resource extraction system 10 in order to suppress the buildup of hydrates. As the MEG is re-cycled through the resource extraction system 10, it may begin to accumulate impurities. However, as described above, ultrasonic flow meters may be less sensitive to impurities than other types of metering devices. As such, the measurement of the MEG by ultrasonic flow meters may prove less problematic than with other types of metering devices.

In addition, the use of ultrasonic flow meters may also allow for identification of blockages (e.g., due to hydrates and so forth) with the chemical injection management system 16. For instance, using ultrasonic flow meters may allow for the identification of hydrate blockage within the throttling section of the chemical injection management system 16. Being able to identify hydrate blockages may allow an operator of the chemical injection management system 16 to decide when and what type of remedial action may be taken in the event of such blockages.

Additionally, the use of ultrasonic flow meters may also allow bi-directional flow measurement, as opposed to other types of metering devices which may only be configured to measure flow in one direction. For example, ultrasonic flow meters are capable of measuring flow in both directions due to the fact that acoustic energy is transmitted in both directions (e.g. between the first transducer 206 and the second transducer 208 of FIG. 11). Therefore, the measurement of flow may be determined in both directions using similar flow measurement logic. The ability to measure flow in both directions may prove beneficial in that the ultrasonic flow meter 132 may be capable of indicating if and when production bore fluids begin traveling back up through the umbilical. As such, an operator of the chemical injection management system 16 may be able to take more effective remedial action.

In the context of bi-directional flow, a variety of acts may be performed based on the direction of fluid flow determined by the controller 134. For instance, the direction of fluid flow, or a change in direction, may be logged in memory. In some embodiments, fluid flow in one direction (i.e., forward or reverse) may trigger an audible or visible warning (e.g., a broken pump warning on a display or speaker), or the valve 128 may be adjusted (e.g., substantially closed).

Figure 12:
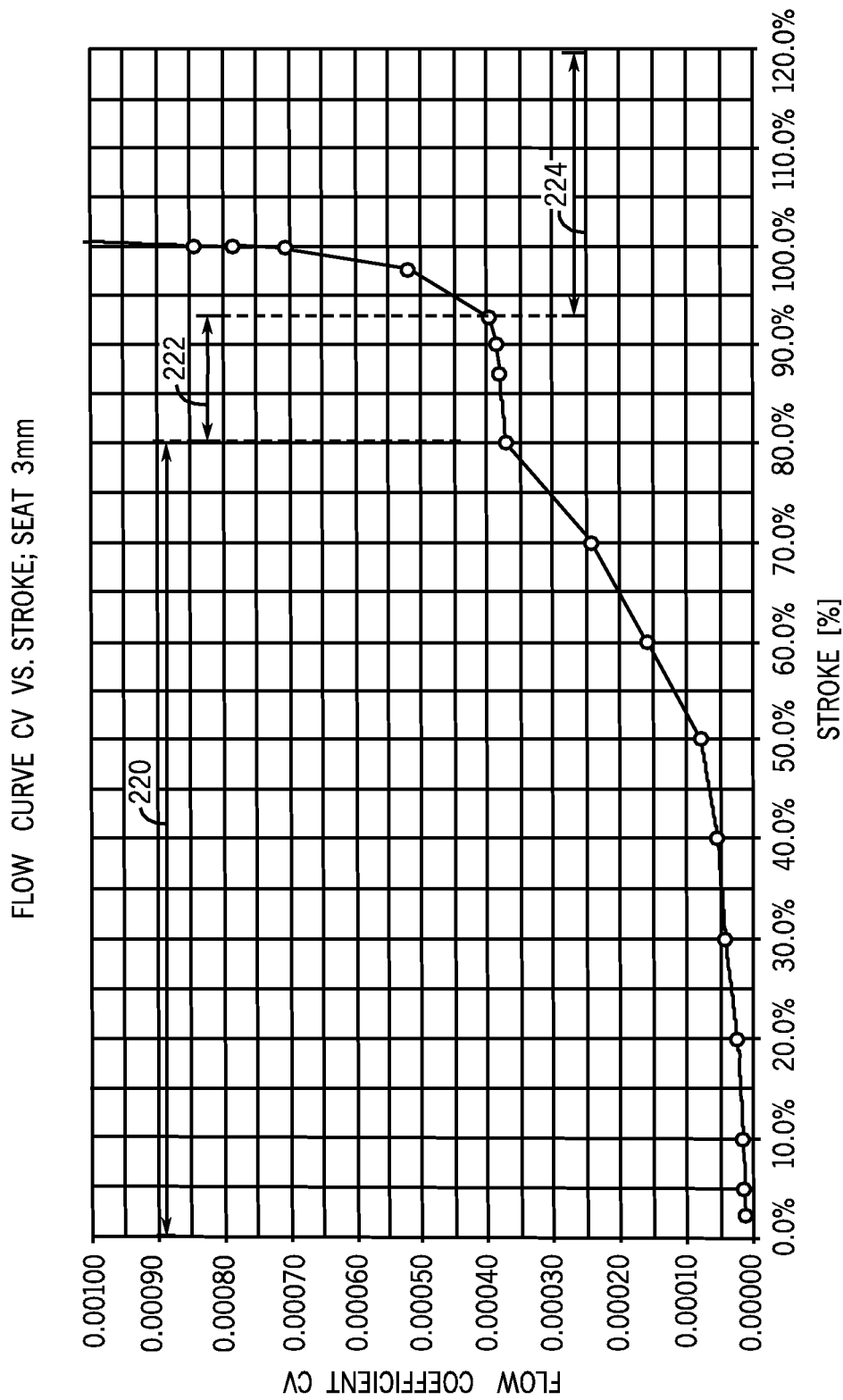
FIG. 12 is a graph depicting needle position versus flow coefficient for the valve of FIG. 7.

FIG. 12 illustrates an example of a flow curve through the valve 128. This graph depicts the position of the needle 142 (FIG. 7), as a percentage of a stroke, versus the flow coefficient (Cv) through the valve 128. The illustrated curve includes a flow control zone 220, a static zone 222, and a flushing zone 224. In some embodiments, the flushing zone 224 may be used to clear debris from the needle 142.

Figure 13:
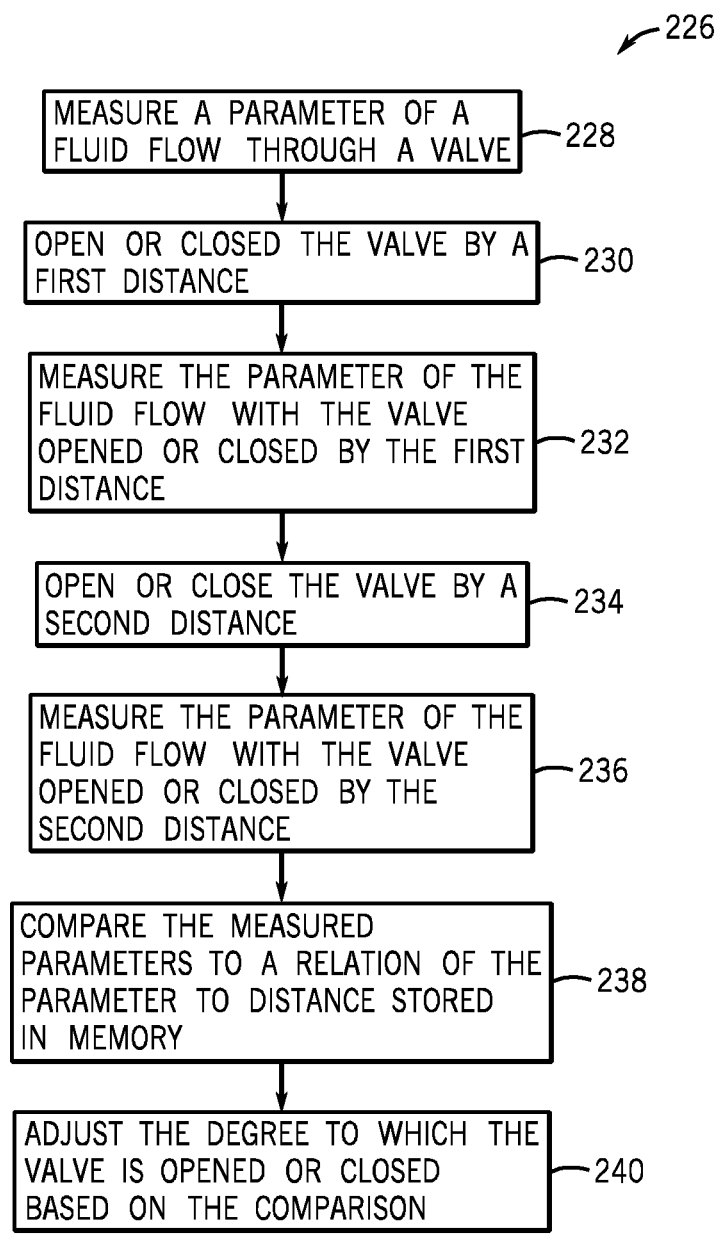
FIG. 13 is a flowchart depicting an exemplary valve-adjustment procedure in accordance with an embodiment of the present technique.

FIG. 13 illustrates an exemplary valve-adjustment procedure 226. The illustrated procedure 226 may include measuring a parameter of a fluid flowing through a valve, as illustrated by block 228. This may include the above-mentioned steps of flowing the fluid through the flow meter 132. Next, the procedure 226 may include opening or closing the valve by a first distance, as illustrated by block 230. This may include the abovementioned steps of moving the needle 142 in the valve 128. The procedure 226 may also include measuring the parameter of the fluid flow with the valve opened or closed by the first distance, as illustrated by block 232, and opening or closing the valve by a second distance, as illustrated by block 234. These acts may again include the above-mentioned steps of operating the flow meter 132 and the valve 128. Next, the procedure 226 may include measuring the parameter of the fluid flow with the valve opened or closed by the second distance, as illustrated by block 236, a step which may include operating the flow meter 132. In some embodiments, the measured parameters from the steps illustrated by blocks 228, 232, and 236, may then be compared to a relationship of the parameter to distance, such as the stroke percentage of the needle 142, stored in memory. Comparing may include comparing the measured values to the above-mentioned stored correlation between needle position and flow rate through the valve 128, such as the correlation illustrated by FIG. 12. Finally, in some embodiments, the degree to which the valve is opened or closed may be adjusted based on the comparison, as illustrated by block 240.

Returning now to FIG. 11, the use of ultrasonic flow meters may also allow for the measurement of other parameters of the fluid flowing through the flow meter in addition to fluid velocity and volumetric flow rate of the fluid. For instance, ultrasonic flow meters may also be capable of measuring the density of the fluid. In addition, ultrasonic flow meters may be capable of determining when viscosity changes occur in the fluid. Specifically, the velocity of sound may be correlated to density and viscosity, as well as contamination of a single fluid. Additionally, the acoustic fluid attenuation is measurable and may be correlated to the viscosity of the fluid or blockages in the case of a single fluid. The ability to measure these additional parameters may prove beneficial in that an operator of the chemical injection management system 16 may be able to monitor the conditions of the fluid and determine if the fluid is behaving adversely due to particular operating conditions of the chemical injection management system 16. In other words, the use of ultrasonic flow meters may allow for enhanced flow conditioning assessment.

In addition, the ultrasonic flow meter 132 may be used either as a primary flow measurement device or a secondary flow measurement device. In particular, the ultrasonic flow meter 132, in certain embodiments, may be used as a backup flow measurement device. For instance, a positive displacement flow meter, or any other type of flow meter (e.g., a variable area flow meter, an orifice plate flow meter, and so forth), may be used as the primary flow measurement device while the ultrasonic flow meter 132 is used as a secondary flow measurement device, or vice versa.

The ultrasonic flow meter 132 may be used in conjunction with closed-loop control by the controller 134 illustrated in FIG. 8. In addition, the ultrasonic flow meter 132 may utilize various standard protocols for transmitting information back to a master control station. For instance, the ultrasonic flow meter 132 may be capable of utilizing the Can-bus (controller-area network bus) protocol as one approach. However, the ultrasonic flow meter 132 may also be capable of utilizing other digital protocols, such as Profibus (process field bus), Modbus, and so forth.

However, although the use of ultrasonic flow meters may allow for numerous benefits, it may also present certain challenges as well. For instance, as opposed to other types of flow metering devices, ultrasonic flow meters may generally involve numerous calculations. For instance, in order to calculate fluid velocities and volumetric fluid flow as described above with respect to FIG. 11, numerous calculations may be made taking into account the transit times between the transducers 206, 208, particular geometries of the measurement pipe 210 (e.g., the inner diameter (ID)) and the acoustic path 212 (e.g., the angle θ), and so forth. These various calculations may lead to greater complexity of the controller 134 and associated processor 172 and memory 174. In addition, the amount of power used by the controller 134, processor 172, and memory 174 may increase as well.

Furthermore, only a limited amount of power may be available in the chemical injection management system 16. As such, the use of the limited power may be an important design consideration. In order to ensure that enough power is available for operation of the ultrasonic flow meter 132, the flow regulator 20 may include various power-saving and power-storing mechanisms. For example, an array of capacitors may be used for storing energy for periods of operation when the stored energy is needed (e.g., for pulsing the transducers 206, 208 or for supplying energy for various calculations).

In addition, external noise from other components of the chemical injection management system 16 may potentially inhibit the accuracy of the ultrasonic flow meters. For instance, noise from the other components may interfere with the ability of the transducers 206, 208 to register the acoustic energy being transmitted between them. However, the external noise may be addressed in a number of various ways, both mechanical and electrical. For instance, extra shielding and padding may be placed around the ultrasonic flow meter 132 to reduce the affect of the external noise. In addition, the intensity of the acoustic pulses may be modified to counteract the adverse affects of the external noise. Additionally, the flow regulator 20 may be designed such that certain electrical or mechanical components may be turned off, or otherwise controlled, during flow measurement periods, such that the external noise has a minimal affect on flow measurement accuracy.

Figure 14:
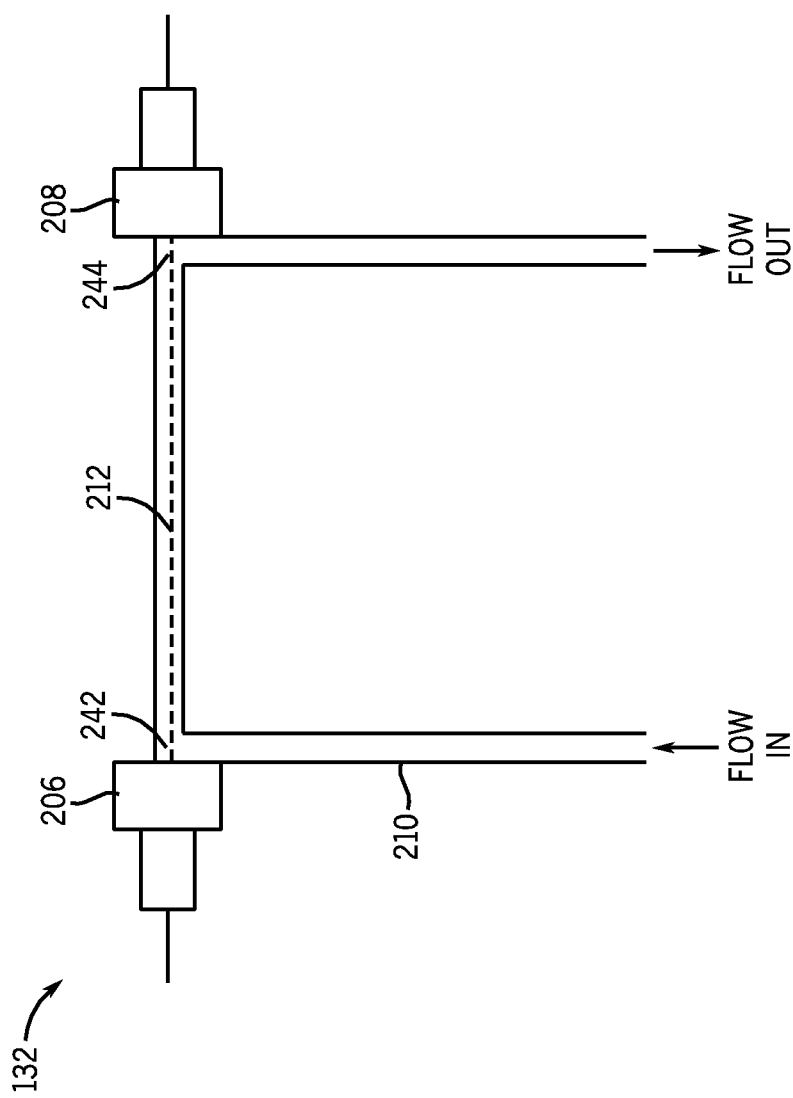
FIG. 14 is a cross-sectional view of another exemplary ultrasonic flow meter used with the flow regulator in accordance with an embodiment of the present technique.

It should be noted that the exemplary embodiment of the ultrasonic flow meter 132 illustrated in FIG. 11 is merely intended to be exemplary and is not the only ultrasonic flow meter design which may be used as pat of the flow regulator 20 of the chemical injection management system 16. For instance, FIG. 14 is a cross-sectional view of another exemplary ultrasonic flow meter 132 used with the flow regulator 20. In this embodiment, the measurement pipe 210 includes a first bend 242 and a second bend 244. More specifically, the fluid flows into the measurement pipe 210, takes a first turn at the first bend 242, takes a second turn at the second bend 244, and then flows out of the measurement pipe 210. In this embodiment, the transducers 206, 208 are located near the bends 242, 244. In particular, the first transducer 206 is located near the first bend 242 and the second transducer 208 is located near the second bend 244.

The transducers 206, 208 are pointed toward each other such that the acoustic path 212 runs along the measurement pipe 210 from the first bend 242 to the second bend 244. As such, in this embodiment, the acoustic energy between the transducers 206, 208 is transmitted either directly against or directly with the flow of fluid. The fluid velocity, volumetric flow rate, and other parameters of the fluid may still be measured as explained above with respect to FIG. 11. However, the specifics of the calculations used may change slightly due to the differences between the geometries of the embodiments in FIGS. 11 and 14.

Figure 15:
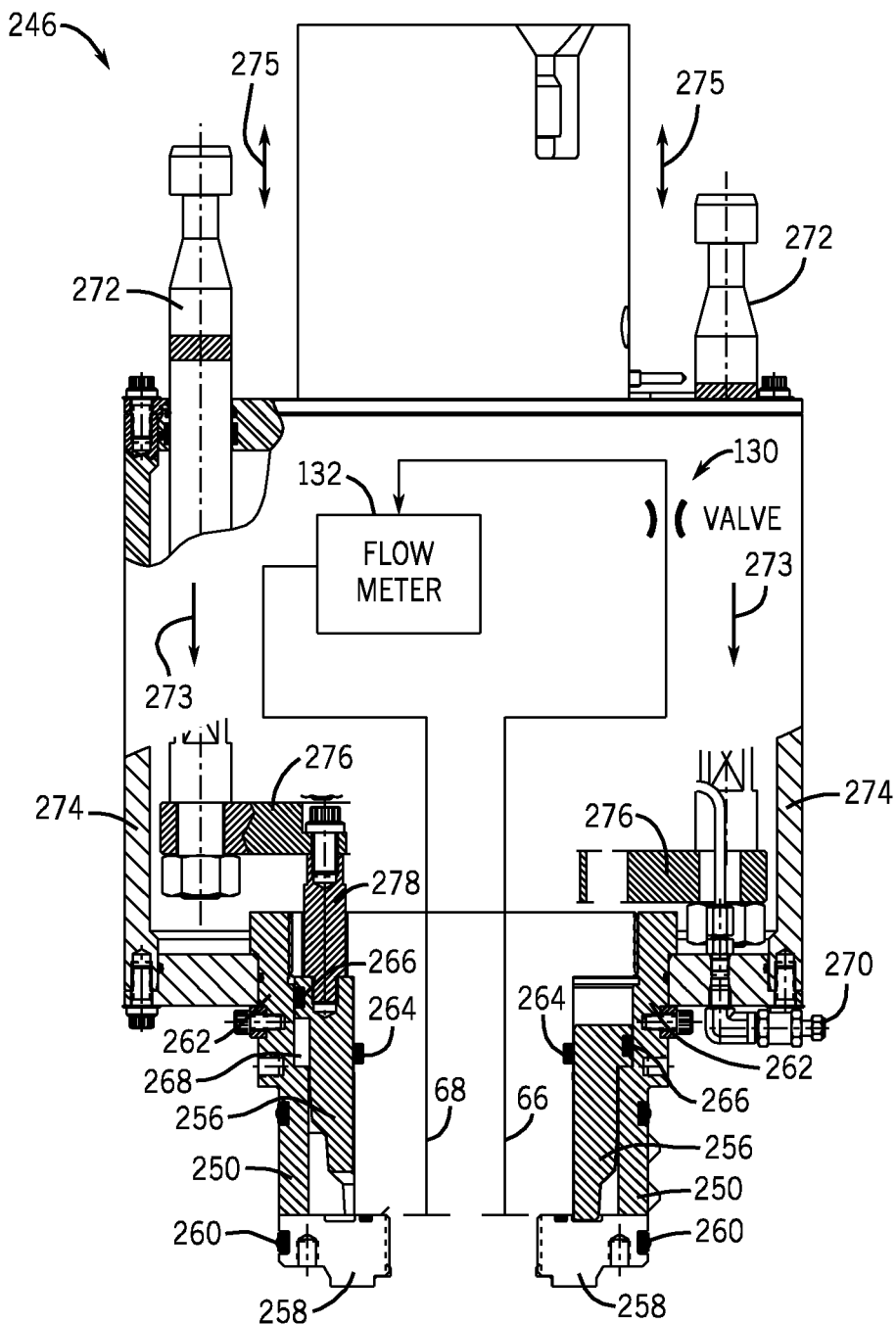
FIG. 15 is a cross-sectional view of an exemplary chemical injection management system insert configured to lock into place within an alternative chemical injection management system receptacle, illustrated in FIG. 16.
Figure 16:
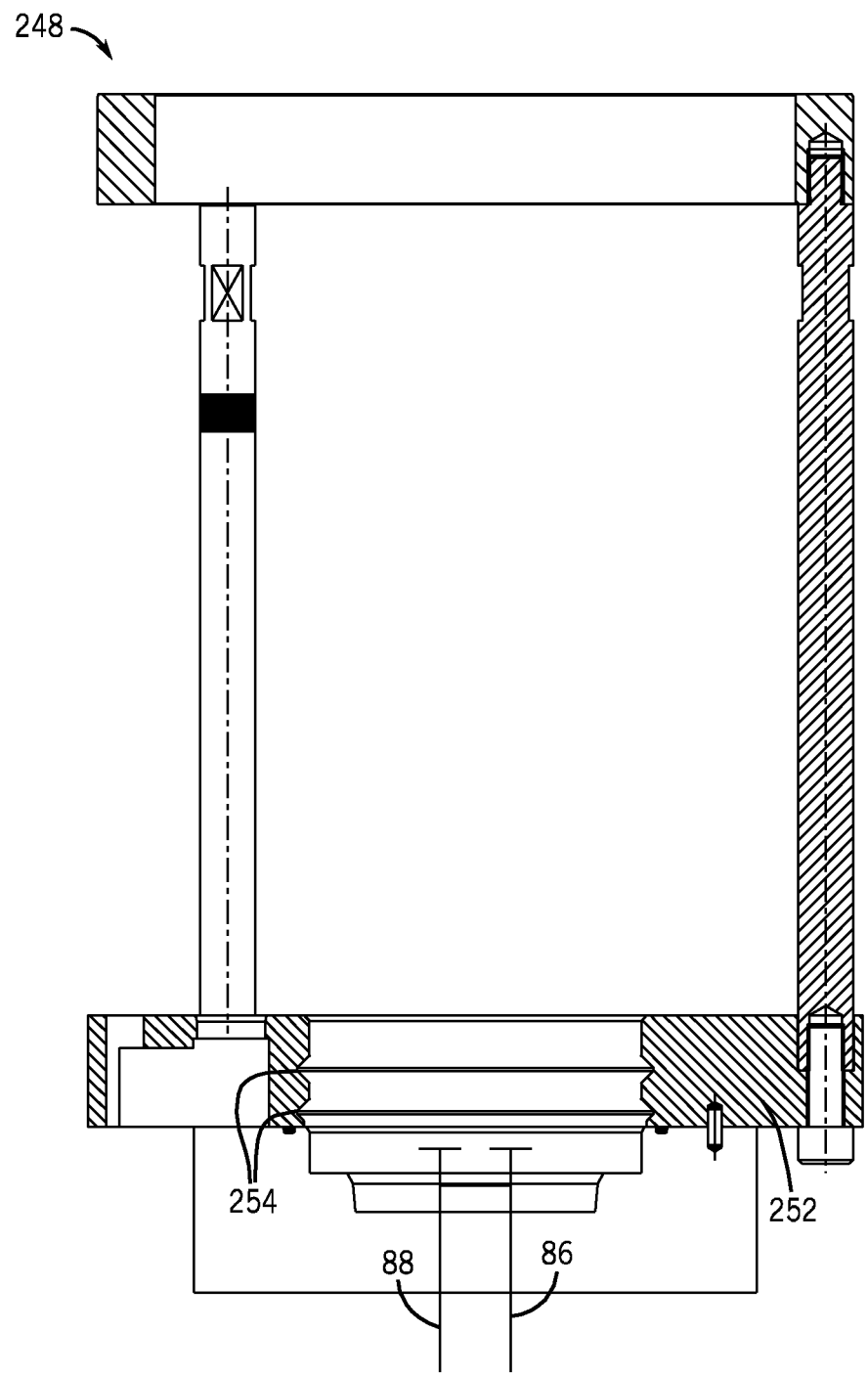
FIG. 16 is a cross-sectional view of an exemplary alternative chemical injection management system receptacle within which the chemical injection management system insert of FIG. 15 may lock into place.
Figure 17:
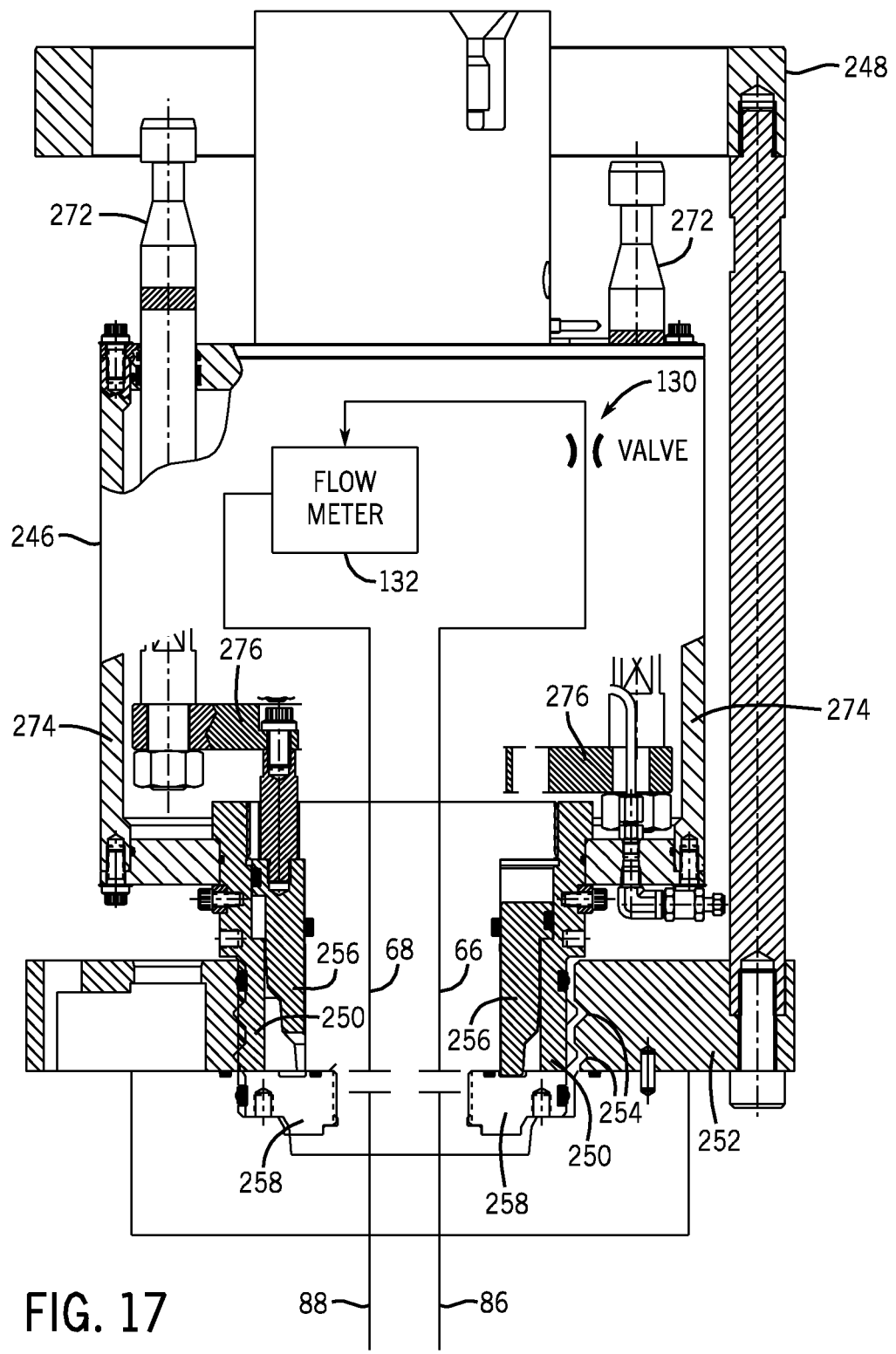
FIG. 17 is a cross-sectional view of the chemical injection management system insert of FIG. 15 locked into place within the chemical injection management system receptacle of FIG. 16.
Figure 18:
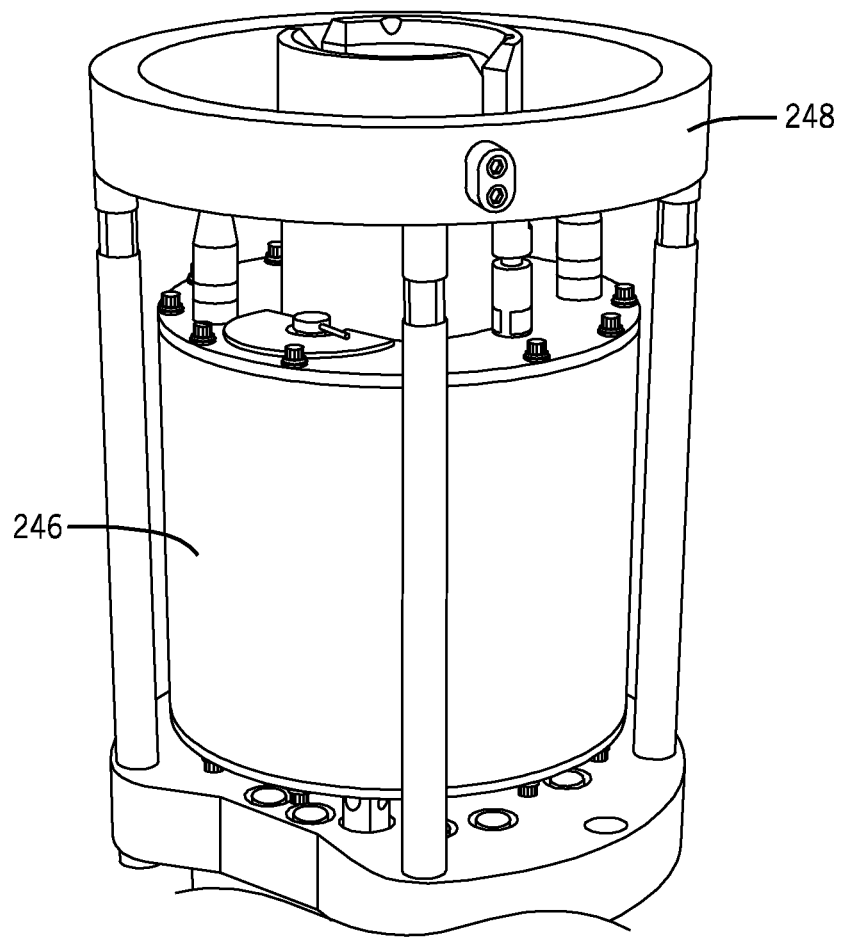
FIG. 18 is a perspective view of the chemical injection management system insert of FIG. 15 locked into place within the chemical injection management system receptacle of FIG. 16.

Additionally, although embodiments of the chemical injection management system 16 illustrated in FIGS. 2 through 6 are shown using a particular technique for locking the chemical injection management system 16 in place, other techniques may be used as well. In particular, another exemplary technique for locking the chemical injection management system 16 in place is illustrated in FIGS. 15 through 18. More specifically, FIG. 15 illustrates an embodiment of a chemical injection management system (C.I.M.S.) insert 246 configured to lock into place within an alternative C.I.M.S. receptacle 248, as illustrated in FIG. 16. In addition, FIGS. 17 and 18 illustrate the C.I.M.S. insert 246 of FIG. 15 locked into place within the C.I.M.S. receptacle 248 of FIG. 16.

In particular, as illustrated, the C.I.M.S. insert 246 may include a fluid-inlet connector 66 and a fluid-outlet connector 68, which may connect with the fluid inlet 86 and fluid outlet 88, respectively, of the C.I.M.S. receptacle 248. The fluid-inlet connector 66 and a fluid-outlet connector 68 may lead to and through the valve 130 and flow meter 132, which are described in greater detail above. As discussed above, the flow meter 132 may in certain embodiments be an ultrasonic flow meter. The C.I.M.S. insert 246 also includes locking members 250, which may be configured to mate with a flange 252 of the C.I.M.S. receptacle 248. In particular, the flange 252 may have a recess or circular grooves 254, which have a conforming shape with the locking members 250 of the C.I.M.S. insert 246. A sliding sleeve 256 may be forced behind the locking members 250 to hold them into the conforming grooves 254 after the C.I.M.S. insert 246 is in place.

The C.I.M.S. insert 246 also has a lower support plate 258 which may be connected to the tree 14 or a manifold. In addition, a seal 260 may be used to seal out seawater between the lower support plate 258 of the C.I.M.S. insert 246 and the flange 252 of the C.I.M.S. receptacle 248. A housing 262, in conjunction with the lower support plate 258, may define an opening through which the locking members 250 may move radially for a lock into the grooves 254 of the flange 252 of the C.I.M.S. receptacle 248.

The sliding sleeve 256 has an inner seal 264, an outer seal 266, and a cavity 268 adjacent the outer seal 266. The inner seal 264 may, for instance, seal against internal components of the C.I.M.S. insert 246 which are not specifically shown. The cavity 268 may be connected to a hydraulic pressure source 270. By providing pressurized hydraulic fluid into the cavity 268, the increase in pressure may raise the sliding sleeve 256 as a backup way to retract the locking members 250 for release of the C.I.M.S. insert 246. Otherwise, the locking members 250 may move radially outward by applying axial force on one of the rods 272 in an axial direction 273 toward the lower end of the C.I.M.S. insert 246. The rods 272 extend through a sealed housing 274, which may be filled with a lubricant and may be sealed to exclude seawater as the rods 272 are moved in opposite axial directions 275 by the ROV (not shown). A plate 276 may move in tandem with the rods 272. In addition, another rod 278 may be connected to the plate 276 and the sliding sleeve 256. As a result, when the ROV moves one of the rods 272 down axially (e.g., as indicated by arrow 273), the sliding sleeve 256 moves down axially as well and the locking members 250 move radially into the circular grooves 254 of the flange 252 of the C.I.M.S. receptacle 248. To release the C.I.M.S. insert 246, the rods 272 may be raised axially and the C.I.M.S. insert 246 will move out of the locked position, since the locking members 250 become unsupported after retraction of the sliding sleeve 256. In addition, as a backup method for moving the sliding sleeve 256 up axially, hydraulic pressure may be applied to the cavity 268.

Using the alternative embodiments of the C.I.M.S. insert 246 and the C.I.M.S. receptacle 248 illustrated in FIGS. 15 through 18 may lead to several benefits. The seals (e.g., the inner seal 264 and the outer seal 266) may keep circulating seawater away from the locking members 250, thus minimizing the adverse affects of debris and corrosion on the locking members 250. In addition, the moving parts that operate the sliding sleeve 256 are disposed within the housing 274, which excludes seawater and, as explained above, may be filled with a lubricating fluid. By placing these components in a lubricating fluid, the design life may be improved while corrosion, algae growth, and debris may be prevented. In addition, only a portion of the rods 272 extend from the housing 274 and are directly exposed to seawater. Furthermore, seals 280 may block seawater from entering the housing 274 near the rods 272.

Figure 19:
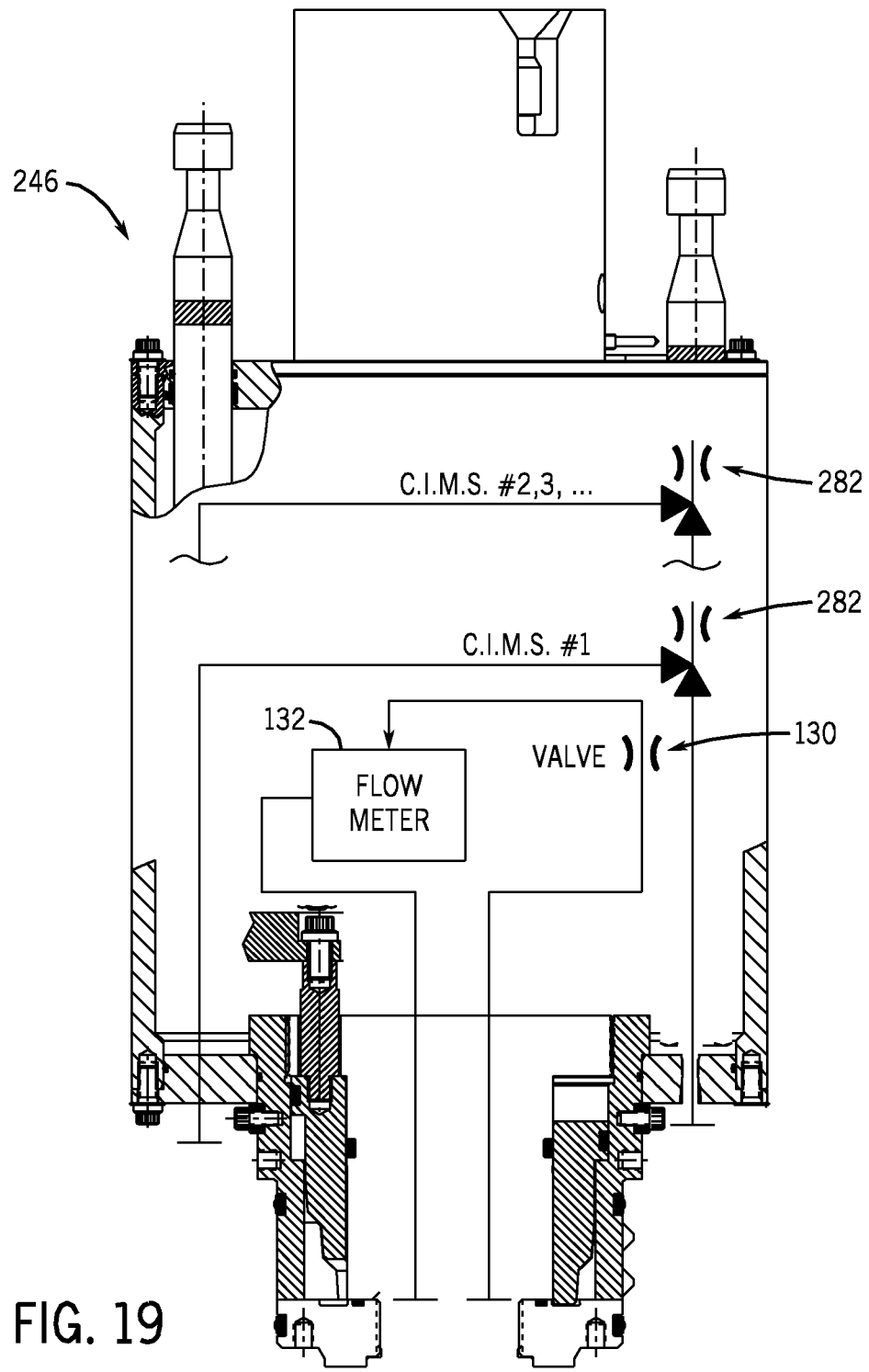
FIG. 19 is a cross-sectional view of an exemplary chemical injection management system insert containing multiple chemical injection management systems.

It should also be noted that while only one C.I.M.S. insert 246 is shown locked into place within the C.I.M.S. receptacle 248 in FIGS. 15 through 18, multiple combinations of chemical injection management systems 16 and C.I.M.S. inserts 246 may actually be used within a single C.I.M.S. receptacle 248. As such, multiple chemical injection management systems 16 and C.I.M.S. inserts 246 may be configured to operate in tandem within the C.I.M.S. receptacle 248. For instance, FIG. 19 illustrates multiple chemical injection management systems 16 within a single C.I.M.S. insert 246. As illustrated, C.I.M.S. insert connection valves 282 may link multiple chemical injection management systems 16 within a single C.I.M.S. insert 246. In addition, other components of the chemical injection management systems 16 and the C.I.M.S. inserts 246 may similarly be configured to connect with each other.

By combining multiple chemical injection management systems 16 and C.I.M.S. inserts 246, space within the tree 14 or manifold may be saved. Furthermore, common components of the resource extraction system 10 (e.g., electrical umbilicals, lockdown components, volume compensation equipment, and so forth) may be utilized when multiple chemical injection management systems 16 are located within a single C.I.M.S. insert 246. In addition, having only one retrievable package may aid in the replacement of the C.I.M.S. inserts 246.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. A system, comprising:
a chemical injection unit, comprising:
 a housing;
 a chemical inlet;
 a chemical outlet;
 a fluid path extending through the housing from the chemical inlet to the chemical outlet;
 a non-invasive meter disposed along the fluid path, wherein the non-invasive meter comprises first and second transducers that are offset from one another by an offset distance, the first transducer is configured to transmit a first energy through the fluid path to the second transducer, and the second transducer is configured to transmit a second energy through the fluid path to the first transducer; and
 a controller coupled to the non-invasive meter, wherein the non-invasive meter is configured to measure one or more parameters based on a comparison of a first transmission of the first energy from the first transducer to the second transducer and a second transmission of the second energy from the second transducer to the first transducer.

2. The system of claim 1, wherein the non-invasive meter is configured to determine a flow direction of fluid flow, a change in flow direction of fluid flow, or a combination thereof.

3. The system of claim 2, wherein the non-invasive meter is configured to determine a flow rate of fluid flow, a velocity of fluid flow, or a combination thereof.

4. The system of claim 3, wherein the non-invasive meter is configured to determine a density of fluid flow, a viscosity of fluid flow, or a combination thereof.

5. The system of claim 2, wherein the non-invasive meter is bi-directionally configured to measure one or more parameters in a first flow direction through the fluid path and a second flow direction through the fluid path, and the first and second flow directions are opposite to one another.

6. The system of claim 1, wherein the first and second energies comprise thermal energy.

7. The system of claim 1, wherein the first and second energies comprise optical energy.

8. The system of claim 1, wherein the first and second energies comprise magnetic energy.

9. The system of claim 1, wherein the first and second energies comprise acoustic energy.

10. The system of claim 1, wherein the non-invasive meter comprises an ultrasonic meter, the first energy comprises a first ultrasonic energy, and the second energy comprises a second ultrasonic energy.

11. The system of claim 1, wherein the non-invasive meter comprises noise shielding disposed about the first and second transducers.

12. The system of claim 1, wherein the non-invasive meter comprises a noise reduction feature configured to turn off one or more noise generating components during a measurement by the first and second transducers.

13. The system of claim 1, wherein the comparison comprises a difference in transmission times of the first transmission versus the second transmission.

14. The system of claim 1, wherein the non-invasive meter is configured to measure the one or more parameters to identify a contaminant, a blockage, or a combination thereof, in a fluid flow.

15. The system of claim 1, wherein the first and second transducers are disposed coaxial with an axis of the fluid path.

16. The system of claim 15, wherein the first transducer is disposed adjacent a first bend in the fluid path and the second transducer is disposed adjacent a second bend in the fluid path.

17. The system of claim 1, wherein the first and transducers are acutely angled relative to an axis of the fluid path.

18. The system of claim 1, wherein the first and second transducers are disposed circumferentially about the fluid path.

19. The system of claim 1, comprising a valve disposed along the fluid path.

20. The system of claim 1, comprising a tree interface coupled to the housing, wherein the tree interface comprises the chemical inlet, the chemical outlet, and a mechanical connector configured to couple the chemical injection unit to a tree of a mineral extraction system.

21. The system of claim 20, comprising the tree of the mineral extraction system coupled to the chemical injection unit.

22. A system, comprising:
  a unit, comprising:
    a housing;
    an interface coupled to the housing, wherein the interface comprises a fluid inlet, a fluid outlet, and a mechanical connector configured to couple the unit to a mating interface;
    a fluid path extending through the housing from the fluid inlet of the interface to the fluid outlet of the interface;
    a valve disposed along the fluid path; and
    a non-invasive meter disposed along the fluid path within the housing, wherein the non-invasive meter comprises first and second transducers that are offset from one another by an offset distance, and wherein the non-invasive meter comprises noise shielding disposed about the first and second transducers, or a noise reduction feature configured to turn off one or more noise generating components during a measurement by the first and second transducers, or both.

23. The system of claim 22, wherein the non-invasive meter is configured to determine a density of fluid flow, a viscosity of fluid flow, or a combination thereof, wherein the non-invasive meter is configured to determine a flow direction of fluid flow, a change in flow direction of fluid flow, or a combination thereof, and wherein the non-invasive meter is configured to determine a flow rate of fluid flow, a velocity of fluid flow, or a combination thereof.

24. A system, comprising:
  a unit, comprising:
    a housing;
    a fluid inlet;
    a fluid outlet;
    a fluid path extending through the housing from the fluid inlet to the fluid outlet;
    a non-invasive meter disposed along the fluid path within the housing, wherein the non-invasive meter comprises first and second transducers that are offset from one another by an offset distance, the first transducer is configured to transmit a first energy through the fluid path to the second transducer, and the second transducer is configured to transmit a second energy through the fluid path to the first transducer; and
  a controller coupled to the non-invasive meter, wherein the non-invasive meter is configured to measure one or more parameters based on a comparison of a first transmission of the first energy from the first transducer to the second transducer and a second transmission of the second energy from the second transducer to the first transducer.

25. The system of claim 24, wherein the non-invasive meter is configured to determine a density of fluid flow, a viscosity of fluid flow, or a combination thereof, wherein the non-invasive meter is configured to determine a flow direction of fluid flow, a change in flow direction of fluid flow, or a combination thereof, and wherein the non-invasive meter is configured to determine a flow rate of fluid flow, a velocity of fluid flow, or a combination thereof.

* * * * *